(12) United States Patent
Matsui et al.

(10) Patent No.: US 9,812,264 B2
(45) Date of Patent: Nov. 7, 2017

(54) ELECTROCHEMICAL ENERGY STORAGE DEVICE WHICH EXHIBITS CAPACITY THROUGH A CONVERSION REACTION, AND ACTIVE MATERIAL FOR THE SAME AND PRODUCTION METHOD THEREOF

(71) Applicant: PANASONIC CORPORATION, Osaka (JP)

(72) Inventors: Tooru Matsui, Osaka (JP); Zempachi Ogumi, Kyoto (JP); Toshiro Hirai, Kyoto (JP); Akiyoshi Nakata, Kyoto (JP)

(73) Assignee: PANASONIC CORPORATION, Osaka (JP)

( * ) Notice: Subject to any disclaimer, the term of this patent is extended or adjusted under 35 U.S.C. 154(b) by 496 days.

(21) Appl. No.: 14/235,382

(22) PCT Filed: Mar. 11, 2013

(86) PCT No.: PCT/JP2013/001564
§ 371 (c)(1),
(2) Date: Jan. 27, 2014

(87) PCT Pub. No.: WO2013/157189
PCT Pub. Date: Oct. 24, 2013

(65) Prior Publication Data
US 2014/0242474 A1    Aug. 28, 2014

(30) Foreign Application Priority Data

Apr. 16, 2012  (JP) ................................. 2012-092733
Apr. 16, 2012  (JP) ................................. 2012-092735

(51) Int. Cl.
*H01M 6/16* (2006.01)
*H01G 11/04* (2013.01)
(Continued)

(52) U.S. Cl.
CPC ............. *H01G 11/04* (2013.01); *H01G 11/30* (2013.01); *H01G 11/54* (2013.01); *H01G 11/60* (2013.01);
(Continued)

(58) Field of Classification Search
CPC ........ H01G 11/54; H01G 11/60; H01G 11/04; H01G 11/30; H01M 10/052; H01M 4/582;
(Continued)

(56) References Cited

U.S. PATENT DOCUMENTS 6,120,941 A * 9/2000 Lee ....................... C07C 311/09
429/213
2003/0054258 A1  3/2003 Ito et al.
(Continued)

FOREIGN PATENT DOCUMENTS

EP  1873850 A1  1/2008
EP  2169755 A1  3/2010
(Continued)

OTHER PUBLICATIONS

Gmitter et al., "Formation, dynamics, and implication of solid electrolyte interphase in high voltage reversible conversion fluoride nanocomposites," Journal of Materials Chemistry, the Royal Society of Chemistry, vol. 20 (2010), pp. 4149-4161.
(Continued)

*Primary Examiner* — Gary Harris
(74) *Attorney, Agent, or Firm* — McDermott Will & Emery LLP

(57) ABSTRACT

Disclosed is a high-capacity electrochemical energy storage device in which a conversion reaction proceeds as the oxidation-reduction reaction, and the separation (hysteresis) between the electrode potentials for oxidation and reduction is small. The electrochemical energy storage device includes
(Continued)

a first electrode including a first active material, a second electrode including a second active material, and a non-aqueous electrolyte interposed between the first and second electrodes. At least one of the first and second active materials is a metal salt having a polyatomic anion and a metal ion, and the metal salt is capable of oxidation-reduction reaction involving reversible release and acceptance of the polyatomic anion.

7 Claims, 10 Drawing Sheets

(51) Int. Cl.
```
H01G 11/54      (2013.01)
H01M 10/052     (2010.01)
H01G 11/30      (2013.01)
H01G 11/60      (2013.01)
H01M 4/58       (2010.01)
H01M 10/0568    (2010.01)
```
(52) U.S. Cl.
CPC ......... H01M 4/582 (2013.01); H01M 4/5825 (2013.01); H01M 10/052 (2013.01); H01M 10/0568 (2013.01); Y02E 60/13 (2013.01)

(58) Field of Classification Search
CPC ............ H01M 4/5825; H01M 10/0568; Y02E 60/122; Y02E 60/13
USPC ........................................................ 429/338
See application file for complete search history.

(56) References Cited

U.S. PATENT DOCUMENTS

| | | | |
|---|---|---|---|
| 2007/0077493 A1 | 4/2007 | Yazami et al. |
| 2007/0077495 A1 | 4/2007 | Yazami et al. |
| 2007/0218364 A1 | 9/2007 | Whitacre et al. |
| 2007/0231696 A1 | 10/2007 | Yazami et al. |
| 2007/0231697 A1 | 10/2007 | Yazami et al. |
| 2008/0102373 A1 | 5/2008 | Potanin |
| 2008/0171268 A1 | 7/2008 | Yazami |
| 2009/0029237 A1 | 1/2009 | Yazami |
| 2009/0258294 A1 | 10/2009 | Yazami et al. |
| 2010/0136438 A1 | 6/2010 | Nakayama et al. |
| 2010/0221603 A1 | 9/2010 | Yazami et al. |
| 2011/0003149 A1 | 1/2011 | Yazami et al. |
| 2011/0111286 A1 | 5/2011 | Yamamoto et al. |
| 2011/0189548 A1* | 8/2011 | Xu .......................... H01M 6/00 429/332 |
| 2012/0202119 A1 | 8/2012 | Oki et al. |

FOREIGN PATENT DOCUMENTS

| | | | |
|---|---|---|---|
| EP | 2287957 A1 | 2/2011 |
| EP | 2557619 A1 | 2/2013 |
| GB | 2230640 A | 10/1990 |
| JP | 61-165957 A | 7/1986 |
| JP | 62-002469 A | 1/1987 |
| JP | 02-247982 A | 10/1990 |
| JP | 2000-021390 A | 1/2000 |
| JP | 2000021390 A * | 1/2000 |
| JP | 2000-353543 A | 12/2000 |
| JP | 2005-093276 A | 4/2005 |
| JP | 2008-537312 A | 9/2008 |
| JP | 2009-021085 A | 1/2009 |
| JP | 2009-529222 A | 8/2009 |
| JP | 2010-015979 A | 1/2010 |
| JP | 2012-221886 A | 11/2012 |
| WO | 2006/112756 A1 | 10/2006 |
| WO | 2007/040547 A1 | 4/2007 |
| WO | 2007/098369 A2 | 8/2007 |
| WO | 2007/098478 A2 | 8/2007 |
| WO | 2007/126436 A2 | 11/2007 |
| WO | 2007/143240 A2 | 12/2007 |
| WO | 2007/146453 A2 | 12/2007 |
| WO | 2008/105916 A2 | 9/2008 |
| WO | 2009/008232 A1 | 1/2009 |
| WO | 2009/148112 A1 | 12/2009 |
| WO | 2011/117993 A1 | 9/2011 |

OTHER PUBLICATIONS

Amatucci et al., "Fluoride based electrode materials for advanced energy storage devices," Journal of Fluorine Chemistry, Elsevier, vol. 128, (2007), pp. 243-262.

International Search Report issued in International Application No. PCT/JP2013/001564 dated Apr. 23, 2013, 3 pgs.

* cited by examiner

ELECTROCHEMICAL ENERGY STORAGE DEVICE WHICH EXHIBITS CAPACITY THROUGH A CONVERSION REACTION, AND ACTIVE MATERIAL FOR THE SAME AND PRODUCTION METHOD THEREOF

RELATED APPLICATIONS

This application is the U.S. National Phase under 35 U.S.C. §371 of International Application No. PCT/JP2013/001564, filed on Mar. 11, 2013, which in turn claims the benefit of Japanese Application No. 2012-092733, filed on Apr. 16, 2012 and Japanese Application No. 2012-092735, filed Apr. 16, 2012, the disclosures of which are incorporated by reference herein.

TECHNICAL FIELD

The present invention relates to electrochemical energy storage devices such as non-aqueous electrolyte secondary batteries and hybrid capacitors, and specifically relates to an improvement of active material for such storage devices.

BACKGROUND ART

With increasing demand in recent years for higher performance and longer operating time of various devices such as cellular phones, portable information devices, laptop computers, camcorders, and portable game players, electrochemical energy storage devices incorporated in those devices are required to have a higher energy density.

Lithium ion batteries, one of electrochemical energy storage devices, include as a positive electrode active material, for example, lithium cobalt oxide ($LiCoO_2$). When charged, lithium cobalt oxide releases lithium ion and converts into, for example, $Li_{0.5}CoO_2$. When discharged, the lithium cobalt oxide absorbs lithium ion and converts into $Li_{0.5}CoO_2$ again. Note that $Li_{0.5}CoO_2$ in a charged state has an electric capacity of as small as 142 mAh/g. The discharge reaction is represented by the reaction formula (1):

$$4Li_{0.5}CoO_2 + 2Li^+ + 2e \rightarrow 4LiCoO_2 \quad (1).$$

A negative electrode active material used for lithium ion batteries is, for example, an intercalation compound of lithium and graphite. Even in the composition of $C_6Li$, the electric capacity thereof is 339 mAh/g.

As shown above, as long as conventional active materials are used, further improvement of energy density of lithium ion batteries cannot be expected. Therefore, use of an active material having an electric capacity higher than that of lithium cobalt oxide or intercalation compound ($C_6Li$) has been required.

For example, use of $FeF_2$ as a positive electrode active material has been examined. When discharged, $FeF_2$ reacts with lithium and decomposes into iron metal (Fe) and lithium fluoride (LiF). This reaction is represented by the reaction formula (2):

$$FeF_2 + 2Li^+ + 2e \rightarrow Fe + 2LiF \quad (2).$$

Comparison between the reaction formulas (1) and (2) shows that the formula weight of $FeF_2$ is much smaller than that of $4Li_{0.5}CoO_2$. Therefore, the use of $FeF_2$ as a positive electrode active material can significantly increase the electric capacity. Such reaction is known as a conversion reaction. $FeF_2$ has a theoretical electric capacity of 571 mAh/g (see Non Patent Literature 1).

However, in a conversion reaction, a great difference occurs between the electric potentials at the electrode for oxidation (charge at the positive electrode, discharge at the negative electrode) and for reduction (discharge at the positive electrode, charge at the negative electrode); in other words, hysteresis exists. For example, in the case of $FeF_2$, hysteresis of 1 V or more exists between charge and discharge at 60° C. (see Non Patent Literature 2). This means not only that the energy inputted during charge is wasted, but also that the discharge voltage is reduced more than expected. In short, theoretically, a high electric capacity can be expected, but due to the existence of hysteresis of as high as 1 V, a power storage device having a high energy density is difficult to achieve in the end.

Furthermore, a conversion reaction as represented by the reaction formula (2) does not always occur easily. In order to render $FeF_2$ electrochemically active, it is necessary to pulverize $FeF_2$ into fine particles of nanometer size. Moreover, in order to use $FeF_2$ as an active material for a battery, it is necessary to bring an electrically conductive material such as carbon material into contact with the surfaces of the fine particles.

As for the negative electrode active material, use of an alkaline earth metal, instead of the intercalation compound ($C_6Li$), has been examined. For example, use of magnesium metal (3830 mAh/cm³) and use of calcium metal (2070 mAh/cm³) have been examined.

In order to use magnesium metal as a negative electrode active material, it is necessary to use a non-aqueous electrolyte having magnesium ion conductivity. However, no such electrolyte as satisfying the required properties has been obtained. Although there is reported an electrolyte that can electrochemically precipitate and dissolve magnesium metal, such an electrolyte has problems in the stability etc. When importance is placed on the stability of the electrolyte, however, magnesium metal cannot be properly precipitated and dissolved in the electrolyte.

For example, there is reported a non-aqueous electrolyte in which magnesium chloride is dissolved in tetrahydrofuran (THF) (see Patent Literature 1). It is necessary, however, to add dimethylaluminum chloride ($(CH_3)_2AlCl$) to the non-aqueous electrolyte. This electrolyte, in which a complex having a plurality of magnesium ions as nucleus and a complex having aluminum ion are considered to be produced, can electrochemically precipitate and dissolve magnesium metal. Disadvantageously, however, dimethylaluminum chloride is highly combustible and highly corrosive, and therefore, is difficult to handle.

Another report says that an electrolyte with magnesium ion conductivity can be obtained by heating magnesium metal at 60° C. in, for example, 1,2-dimethoxyethane, methyl trifluoromethanesulfonate, tetrabutylammonium tetrafluoroborate, or aluminum chloride. The report says that discharge reaction is possible in this electrolyte, when manganese oxide is used as a positive electrode, and magnesium metal is used as a negative electrode (see Patent Literature 2). Through this reaction, magnesium metal is electrochemically dissolved as shown in the reaction formula (3):

$$Mg \rightarrow Mg^{2+} + 2e \quad (3).$$

However, methyl trifluoromethanesulfonate is an essential component of a non-aqueous electrolyte with magnesium ion conductivity, and in a non-aqueous electrolyte not containing this component, discharge is impossible. Moreover, no report says that charge reaction represented by the reaction formula (4) is possible:

$$Mg^{2+} + 2e \rightarrow Mg \quad (4).$$

Under these circumstances, the present inventors have studied and found that magnesium metal is difficult to produce according to the reaction formula (4), in the electrolyte proposed by Patent Literature 2. They also found that methyl trifluoromethanesulfonate, an essential component of the electrolyte, reacts with moisture as impurities, to produce trifluoromethane sulfonic acid. The trifluoromethane sulfonic acid causes the positive electrode active material, current collector, and metal case, to corrode, and the corrosion becomes severe as the electric potential at the positive electrode increases.

CITATION LIST

Non Patent Literature

[NPL 1] Glenn G. Amatucci, Nathalie Pereira, "Fluoride based electrode materials for advanced energy storage devices", *Journal of Fluorine chemistry, the Netherland, Elsevier,* 2007, Vol. 128, pp. 243-262

[NPL 2] Andrew J. Gmitter, Fadwa Badway, Sylvie Rangan, Robert A. Bartynski, Anna Halajko, Nathalie Pereira, Glenn G. Amatucci, "Formation, dynamics, and implication of solid electrolyte interphase in high voltage reversible conversion fluoride nanocomposites", *Journal of Materials Chemistry, England, The Royal Society of Chemistry,* 2010, Vol. 20, pp. 4149-4161

Patent Literature

[PTL 1] Japanese Laid-Open Patent Publication No. 2009-21085
[PTL 2] Japanese Laid-Open Patent Publication No. 2010-15979

SUMMARY OF INVENTION

Technical Problem

As discussed above, when a conversion reaction is utilized in attempt to obtain an electrochemical energy storage device having a high capacity, the theoretical electric capacity can be increased, but disadvantageously, the separation between the electrode potentials for charge and discharge is increased (i.e., the hysteresis is large). Moreover, facilitating the conversion reaction requires the active material to be pulverized into fine particles, and the active material to be formed into a composite with a conductive material.

Use of an alkaline earth metal as the negative electrode active material has been expected as one possible way to obtain a high-capacity electrochemical energy storage device; however, a power storage device capable of charge and discharge of alkaline earth metal has not been obtained yet.

Solution to Problem

In view of the above, the present invention proposes a technique to maintain the high electric capacity of an active material that causes a conversion reaction, as well as to reduce the electrode potential hysteresis between oxidation and reduction. This enables to reduce the loss of charged energy and thus to provide an electrochemical energy storage device having a high energy density. The present invention also provides a technique to use an alkaline earth metal, in particular, magnesium metal, as a negative electrode active material.

One aspect of the present invention relates to an electrochemical energy storage device including: a first electrode including a first active material; a second electrode including a second active material; and a non-aqueous electrolyte interposed between the first electrode and the second electrode. At least one of the first active material and the second active material is a metal salt having a polyatomic anion and a metal ion. The metal salt is capable of oxidation-reduction reaction involving reversible release and acceptance of the polyatomic anion.

Preferably, the non-aqueous electrolyte contains the polyatomic anion, and the polyatomic anion acts as a carrier between the first electrode and the second electrode.

Preferably, the first active material includes, as the metal salt, a first metal salt having a first polyatomic anion and a first metal ion; and the first metal ion is at least one selected from the group consisting of cations of metal elements belonging to Groups 3 to 15 in the periodic table.

Preferably, the second active material includes, as the metal salt, a second metal salt having a second polyatomic anion and a second metal ion; and the second metal ion is at least one selected from the group consisting of cations of alkali metals and alkaline earth metals.

Another aspect of the present invention relates to a method for producing an active material for an electrochemical energy storage device. The method includes the step of anodically oxidizing a first metal being at least one selected from the group consisting of metals of metal elements belonging to Groups 3 to 15 in the periodic table, in a non-aqueous electrolyte containing a first polyatomic anion, thereby to synthesize a first active material including a first metal salt having the first polyatomic anion and the first metal ion.

Yet another aspect of the present invention relates to an active material for an electrochemical energy storage device, the active material including a first metal salt having a first polyatomic anion and a first metal ion. The first metal ion is at least one selected from the group consisting of cations of metal elements belonging to Groups 3 to 15 in the periodic table, and the first metal salt and an organic solvent form an adduct.

Still another aspect of the present invention relates to an active material for an electrochemical energy storage device, the active material including a second metal salt having a second polyatomic anion and a second metal ion. The second metal ion is at least one selected from the group consisting of cations of alkali metals and alkaline earth metals, and the second metal salt and an organic solvent form an adduct.

Advantageous Effects of Invention

The present invention uses, as an active material, a metal salt which includes a polyatomic anion and a metal ion and is capable of oxidation-reduction reaction involving reversible release and acceptance of the polyatomic anion, so that a conversion reaction can proceed as the oxidation-reduction reaction, and the separation (hysteresis) between the electrode potentials for oxidation and reduction in the conversion reaction can be reduced. Therefore, a high-capacity electrochemical energy storage device can be provided.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
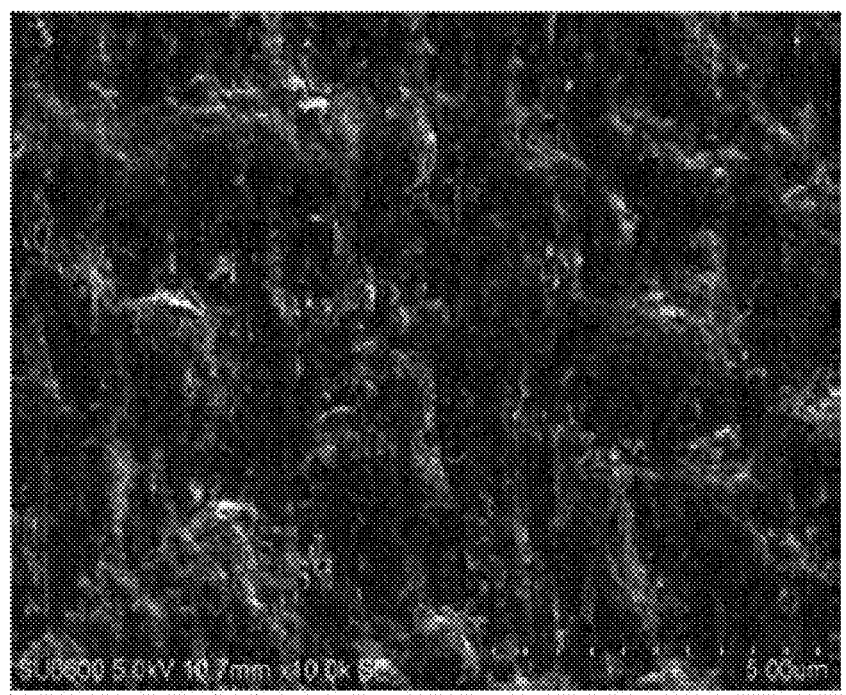
FIG. 1 An electron micrograph of a substance produced on an iron wire by performing cyclic voltammetry in a non-aqueous electrolyte containing tetrahydrofuran FIG. 2 An X-ray diffraction pattern of the substance produced on an iron wire by performing cyclic voltammetry in a non-aqueous electrolyte containing tetrahydrofuran FIG. 3 A cyclic voltammogram of the substance produced on an iron wire by performing cyclic voltammetry in a non-aqueous electrolyte containing tetrahydrofuran, the cyclic voltammogram measured in the same non-aqueous electrolyte FIG. 4 A cyclic voltammogram of an iron wire in a non-aqueous electrolyte with high solute concentration FIG. 5 A cyclic voltammogram of a copper wire in a non-aqueous electrolyte with high solute concentration FIG. 6 A cyclic voltammogram of a copper wire in a non-aqueous electrolyte containing propylene carbonate FIG. 7 A cyclic voltammogram of an iron wire in a non-aqueous electrolyte containing bis(trifluoromethane sulfonyl)imide (TFSI)

An electrochemical energy storage device of the present invention includes a first electrode including a first active material, a second electrode including a second active material, and a non-aqueous electrolyte interposed between the first electrode and the second electrode. At least one of the first active material and the second active material is a metal salt having a polyatomic anion and a metal ion. The metal salt is capable of oxidation-reduction reaction involving reversible release and acceptance of the polyatomic anion. The non-aqueous electrolyte preferably has electrical conductivity via the polyatomic anion acting as a carrier.

First, description is given of the case where the first active material is a first metal salt having a first polyatomic anion and a first metal ion, and the first metal salt is used as a positive electrode active material for a non-aqueous electrolyte secondary battery or a hybrid capacitor.

The first metal ion is preferably at least one selected from the group consisting of cations of first metals belonging to Groups 3 to 15 in the periodic table. Specifically, the first metal ion is preferably at least one selected from the group consisting of cations of Ti, V, Cr, Mn, Fe, Co, Ni, Cu, Zn, Al, Zr, Nb, Mo, Ru, Ag, Cd, Sn, W, Re, Pt, Au, Pb, and Bi. The first metal ion is more preferably at least one selected from the group consisting of cations of Fe and Cu. When an ionic liquid is used, the first metal ion is more preferably at least one selected from the group consisting of cations of Fe, Cu, and Bi. The electric potential of the active material is dependent on the kind and the ionic valence of the metal element. Those first metal ions have an electric potential suitable as the positive electrode active material. The first metal ion may be coordinated with an organic solvent.

The first metal salt can be easily prepared by anodically oxidizing at least one selected from the group consisting of first metals belonging to Groups 3 to 15 in the periodic table, in a non-aqueous electrolyte containing a first polyatomic anion. At this time, the first metal salt and the organic solvent in the non-aqueous electrolyte may form an adduct. The organic solvent to form an adduct is preferably tetrahydrofuran.

The following description is on the oxidation-reduction reaction involving reversible release and acceptance of the first polyatomic anion, with respect to the first metal salt having a first polyatomic anion and a first metal ion. Here, description is given of the case where the first metal salt has iron ion ($Fe_2^+$) and $BF_4^-$.

The electrochemical reduction reaction of the first metal salt is a conversion reaction represented by the reaction formula (5). Specifically, the reduction reaction converts $Fe(BF_4)_2$ into Fe.

$$Fe(BF_4)_2 + 2Li^+ + 2e \rightarrow Fe + 2LiBF_4 \quad (5)$$

Conversely, the oxidation reaction is a conversion reaction represented by the reaction formula (6). Specifically, the oxidation reaction converts Fe into $Fe(BF_4)_2$. The iron constitutes the skeleton of the first electrode, and ideally, $Fe(BF_4)_2$ is produced in the first electrode.

$$Fe + 2LiBF_4 \rightarrow Fe(BF_4)_2 + 2Li^+ + 2e \quad (6)$$

To be more generalized, when the alkali metal ion is denoted by $A^+$, the first metal ion is denoted by $Me^{m+}$, and the first polyatomic anion is denoted by $Q^{n-}$, the reduction reaction of the first metal salt ($Me_nQ_m$) is represented by the reaction formula (7):

$$Me^{m+}{}_n Q^{n-}{}_m + m \times n A^+ + m \times n e \rightarrow n \times Me(0) + m \times A^+{}_n Q^{n-} \quad (7).$$

In the reaction formula (7), the first metal ion ($Me^{m+}$) constituting the first metal salt is reduced to a first metal Me(0) with valence 0, but this is not always necessary. It suffices if the valence of the first metal after reduction is smaller than +m. The $A^+{}_n Q^{n-}$ produced through reduction reaction may remain in the first electrode, or partly dissolve in the electrolyte.

A non-aqueous electrolyte secondary battery, one of electrochemical energy storage devices, can be configured by using, for example: the aforementioned first metal salt as the positive electrode active material; and as the negative electrode active material, an alkali metal such as lithium, an alkaline earth metal such as magnesium, aluminum metal, an intercalation compound of lithium and graphite, a lithium-containing alloy, or a lithium-containing oxide. The lithium-containing alloy contains, for example, silicon, tin, lead, and/or bismuth. The lithium-containing oxide contains, for example, silicon and/or tin. In this case, by using an electrolyte containing lithium ion, the discharge reaction represented by the formula (5) and the charge reaction represented by the formula (6) proceed.

A hybrid capacitor, one of electrochemical energy storage devices, can be configured by using, for example, the aforementioned first metal salt as the positive electrode active material, and activated carbon as the negative electrode active material. In this case, the charge reaction represented by the formula (6) proceeds, which produces $Fe(BF_4)_2$ at the positive electrode and causes an alkali metal ion to be adsorbed onto the negative electrode.

Next, description is given of the case where the second active material is a second metal salt having a second polyatomic anion and a second metal ion, and the second metal salt is used as a negative electrode active material for a non-aqueous electrolyte secondary battery or a hybrid capacitor.

The second metal ion is preferably at least one selected from the group consisting of cations of alkali metals and alkaline earth metals. Specifically, the second metal ion is preferably at least one selected from the group consisting of cations of lithium and magnesium.

The second metal salt can be obtained by electrochemically oxidizing at least one second metal selected from the group consisting of alkali metals and alkaline earth metals, in an electrolyte containing a second polyatomic anion. At this time, the second metal salt and the organic solvent in the non-aqueous electrolyte may form an adduct. The organic solvent to form an adduct is preferably tetrahydrofuran.

The following description is on the oxidation-reduction reaction involving reversible release and acceptance of the second polyatomic anion, with respect to the second metal salt having a second polyatomic anion and a second metal ion. Here, description is given of the case where the second metal salt has magnesium ion ($Mg_2^+$) and $BF_4^-$.

The second metal salt having magnesium ion and a fluorocomplex ion slightly dissolves in non-aqueous electrolyte. This property can be utilized to more easily configure an electrochemical energy storage device so as to have excellent reaction reversibility. Furthermore, the second metal salt such as $Mg(BF_4)_2$ does not have flammability or rigidity like those of magnesium metal, and therefore, is easy to handle when used to produce a power storage device.

The second metal salt having magnesium ion and $BF_4^-$ is electrochemically reduced into magnesium metal. On the other hand, magnesium metal is electrochemically oxidized into the second metal salt. The reduction reaction of the secondary metal salt corresponds to the charge reaction of a battery including the second electrode as a negative electrode; and the oxidation reaction of magnesium metal corresponds to the discharge reaction of the battery.

In the case where magnesium metal is present in the negative electrode in a charged state, and $BF_4^-$ is present in the electrolyte, when magnesium metal is electrochemically oxidized, magnesium ion is eluted into the electrolyte. Upon elution, the magnesium ion immediately binds to $BF_4^-$ in the electrolyte, to form $Mg(BF_4)_2$. Because of the low solubility of $Mg(BF_4)_2$, the formed $Mg(BF_4)_2$ remains on the surface of magnesium metal. Specifically, the reaction represented by the formula (8) proceeds:

$$Mg + 2BF_4^- \rightarrow Mg(BF_4)_2 + 2e \qquad (8).$$

Subsequently, the produced $Mg(BF_4)_2$ converts into magnesium metal again through electrochemical reduction. Specifically, during charge, the reaction represented by the formula (9) proceeds, and magnesium metal is produced:

$$Mg(BF_4)_2 + 2e \rightarrow Mg + 2BF_4^- \qquad (9).$$

Here, the combination of the reaction formulas (3) ($Mg \rightarrow Mg^{2+} + 2e$) and (4) ($Mg^{2+} + 2e \rightarrow Mg$) is clearly different from that of the reaction formulas (8) and (9). In a power storage device in which the combination of the reaction formulas (8) and (9) proceeds, almost all amount of magnesium, except a small amount of magnesium ion in the non-aqueous electrolyte, is present in the negative electrode. This means that: $BF_4^-$ in the non-aqueous electrolyte approaches the magnesium metal on the negative electrode and combines therewith, thereby to oxidize the magnesium metal; and $BF_4^-$ is desorbed from the negative electrode, thereby to reduce the second metal salt.

Charge and discharge with larger current are possible through the reactions represented by the formulas (8) and (9), than through those represented by the formulas (3) and (4). This is for the following reasons: the reaction of magnesium ion with a fluorocomplex ion is easier to proceed than the elution reaction of magnesium ion; and the mobility of $BF_4^-$ in the electrolyte is higher than that of magnesium ion.

The reactions represented by the formulas (8) and (9) require polyatomic ions moving in the electrolyte, and do not require magnesium ions moving in the electrolyte. This means that it is not necessary to use a non-aqueous electrolyte having magnesium ion conductivity. Therefore, even when magnesium metal is used as the negative electrode active material, various non-aqueous electrolytes can be used. An electrolyte having polyatomic anion conductivity is easy to handle and can be easily prepared. Moreover, since the electrolyte does not need to have magnesium ion conductivity, there is no need of adding alkyl trifluoromethane sulfonate to the electrolyte. Therefore, the corrosion of the metal component parts is unlikely to occur, and the stable potential window of the electrolyte is broadened.

A non-aqueous electrolyte secondary battery, one of electrochemical energy storage devices, can be configured by using: as the negative electrode active material, a second metal salt having a polyatomic anion and a second metal ion; and as the positive electrode active material, a lithium-containing composite oxide employed in a lithium ion battery, such as $LiCoO_2$, $LiNiO_2$, $Li(Ni_{1/3}Mn_{1/3}CO_{1/3})O_2$, $LiMn_2O_4$, and $Li(Li_xMn_{1-x})O_2$. In this case, by using an electrolyte containing lithium ion, the second metal salt is produced through discharge reaction, and a second metal is produced through charge reaction. For example, when the second metal salt used as the negative electrode active material is $Al(BF_4)_3$, by using an electrolyte containing lithium ion, $Al(BF_4)_3$ is produced during discharge and aluminum metal and $LiBF_4$ are produced during charge, at the negative electrode.

Graphite may be used as the positive electrode for a non-aqueous electrolyte secondary battery. In this case, during charge, a fluorocomplex ion is intercalated between graphite layers, while the fluorocomplex ion is released from the negative electrode, to form magnesium metal at the negative electrode. Other examples that may be used as the positive electrode active material include: electroconductive polymers, such as polypyrrole and polythiophene; and radical electroconductive polymers in which a free radical, =N—O., is incorporated in a polymer having n-conjugated electron clouds. These materials each include a fluorocomplex ion incorporated therein in their synthesis process. Therefore, a battery can be fabricated by using magnesium metal as the negative electrode active material. Upon fabrication, the battery is in a charged state. When the battery is discharged, the fluorocomplex ion is released from the positive electrode active material, and at the negative electrode, the second metal salt having magnesium ion and the fluorocomplex ion is produced.

Likewise, a hybrid capacitor, one of electrochemical energy storage devices, can be configured by using: as the negative electrode active material, a second metal salt having a polyatomic anion and a second metal ion; and as the positive electrode active material, for example, a carbon material.

The carbon material preferably includes activated carbon. Examples of the activated carbon include natural plant-based activated carbon such as palm shell-based activated carbon, synthetic resin-based activated carbon such as phenol-based activated carbon, and fossil fuel-based activated carbon such as coke-based activated carbon. Another example thereof is superfine activated carbon powder prepared by activating carbon black.

The second metal salt serving as the negative electrode active material and the non-aqueous electrolyte preferably include a common fluorocomplex ion. For example, a hybrid capacitor can be fabricated by using a salt of magnesium ion and a fluorocomplex ion for the negative electrode, a non-aqueous electrolyte containing the fluorocomplex ion, and a carbon material as used in an electric double layer capacitor, as the positive electrode active material. In such a hybrid capacitor, during charge, the fluorocomplex ion is adsorbed onto the surface of the polarizable positive electrode, while the fluorocomplex ion is released from the negative electrode, to form magnesium metal at the negative electrode.

The hybrid capacitor and non-aqueous electrolyte secondary battery, in a charged state, include magnesium metal in the negative electrode. When they are discharged from this state, magnesium ion is slightly eluted from magnesium metal into the non-aqueous electrolyte. However, since the reaction represented by the formula (8) proceeds faster than that represented by the formula (3), quick discharge is possible.

Furthermore, it is possible to configure an electrochemical energy storage device including: a first electrode including, as a first electrode active material, a first metal salt having a first polyatomic anion and a first metal ion; a second electrode including, as a second active material, a second metal salt having a second polyatomic anion and a second metal ion; and a non-aqueous electrolyte interposed between the first and second electrodes. In this case, the first polyatomic anion and the second polyatomic anion are preferably the same.

For example, when the first metal salt is $Fe(BF_4)_2$, and the secondary metal salt is $Mg(BF_4)_2$, the reduction reaction at the first electrode can be represented by the reaction formula (10), and the oxidation reaction at the second electrode can be represented by the reaction formula (11). Adding these formulas shows that a reaction represented by the formula (12) proceeds as discharge reaction.

$$Fe(BF_4)_2 + 2e \rightarrow Fe + 2BF_4^- \quad (10)$$

$$Mg + 2BF_4^- \rightarrow Mg(BF_4)_2 + 2e \quad (11)$$

$$Fe(BF_4)_2 + Mg \rightarrow Fe + Mg(BF_4)_2 \quad (12)$$

Preferably, the first polyatomic anion and the second polyatomic are independently at least one selected from the group consisting of: complex ions having boron as nucleus, complex ions having phosphorus as nucleus, complex ions having arsenic as nucleus, complex ions having antimony as nucleus, perchlorate ion ($ClO_4^-$), sulfonate ions, imide ions, methide ions, alkylphosphate ions, $CN^-$, $NO_3^-$, $SO_3^-$, $SO_3^{2-}$, $SO_4^{2-}$, $S_2O_3^{2-}$, $SCN^-$, $CO_3^{2-}$, $PO_4^{3-}$, $CH_3CO_2^-$, $C_2H_5CO_2^-$, $CF_3SO_3^-$, $C_6H_5CO^-$ (benzoate ion), $^-OOC-COO^-$ (oxalate ion), and $C_6H_4(CO_2)_2^-$ (the ortho-, meta-, or para-form of phthalate ion). One or more hydrogen atoms bound to the organic acid ion such as $CH_3CO_2^-$, $C_2H_5CO_2^-$, $CF_3SO_3^-$, $C_6H_5CO^-$, $^-OOC-COO^-$, and $C_6H_4(CO_2)^-$ may be substituted by fluorine atom(s). The first or second electrode may contain one kind of polyatomic anion singly, or two or more kinds of polyatomic anions.

When an ionic liquid is used for the non-aqueous electrolyte, the first polyatomic anion and the second polyatomic anion are preferably independently at least one selected from the group consisting of complex ions having boron as nucleus, imide ions, $CF_3SO_3^-$, and perchlorate ion.

Here, the complex ion is preferably a fluorocomplex ion.

Examples of a fluorocomplex ion having boron as nucleus include $BF_4^-$, $BF_x(CF_3)_y$ (x+y=4, x≠4), $BF_x(C_2F_5)_y$ (x+y=4, x≠4), $BF_x(C_3F_7)_y$ (x+y=4, x≠4), and $BF_x(C_4F_9)_y$ (x+y=4, x≠4). In these fluorocomplex ions, two or more selected from the group consisting of fluorine atoms and perfluoroalkyl groups may be substituted by one or more oxalate ion residues ($O-C(=O)-C(=O)-O$). A particularly preferred fluorocomplex ion having boron as nucleus is $BF_4^-$, which has a small formula weight and the highest mobility.

Examples of a fluorocomplex ion having phosphorus as nucleus include $PF_6^-$, $PF_x(CF_3)_y$ (x+y=6, x≠6), $PF_x(C_2F_5)_y$ (x+y=6, x≠6), $PF_x(C_3F_7)_y$ (x+y=6, x≠6), and $PF_x(C_4F_9)_y$ (x+y=6, x≠6). In these fluorocomplex ions, two or more selected from the group consisting of fluorine atoms and perfluoroalkyl groups may be substituted by one or more oxalate ion residues ($O-C(=O)-C(=O)-O$). A particularly preferred fluorocomplex ion having phosphorus as nucleus is $PF_6^-$, which has a small formula weight and the highest mobility.

Examples of the nucleus of the fluorocomplex ion include, in addition to the aforementioned boron and phosphorus, arsenic and antimony.

Examples of the polyatomic anion include: perchlorate ion ($ClO_4^-$); sulfonate ions, such as $CF_3SO_3^-$, $C_2F_5SO_3^-$, $C_3F_7SO_3^-$, and $C_4F_9SO_3^-$; linear imide ions, such as $(FSO_2)_2N^-$, $(FSO_2)(CF_3SO_2)N^-$, $(CF_3SO_2)_2N^-$ (abbreviated as "TFSI"), $(C_2F_5SO_2)_2N^-$, $(CF_3SO_2)(C_4F_9SO_2)N^-$ and $(CF_3SO_2)(CF_3CO)N^-$; and cyclic imide ions, such as five-membered ring of $(CF_2SO_2)_2N^-$ and six-membered ring of $CF_2(CF_2SO_2)_2N^-$. A particularly preferred imide ion is $(FSO_2)_2N^-$, which has the smallest formula weight.

Other examples of the polyatomic anion include methide ions such as $(CF_3SO_2)_3C^-$.

Still other examples of the polyatomic anion include alkylphosphate ions such as $(CH_3O)_2PO_2^-$, $(C_2H_5O)_2PO_2^-$, and $(CH_3O)(C_2H_5O)PO_2^-$. Here, one or more hydrogen atoms bound to the alkyl group may be substituted by fluorine atom(s).

Here, the non-aqueous electrolyte includes an organic solvent and a solute dissolved therein. The non-aqueous electrolyte may be an ionic liquid.

The solute of the non-aqueous electrolyte is, for example, a salt including an anion and a cation which is a third metal ion. The cation, the third metal ion, includes at least one selected from the group consisting of alkali metals and alkaline earth metals. Specifically, the third metal ion is at least one selected from the group consisting of $Li^+$, $Na^+$, $K^+$, $Rb^+$, $Cs^+$, $Ca^{2+}$, $Sr^{2+}$ and $Ba^{2+}$. The anion in the solute may be the first or second polyatomic anion constituting the first or second active material, or a different one from them. In the conversion reaction, it suffices if the alkali metal ion or the like is bound to the polyatomic anion, or conversely, the alkali metal ion or the like is released from the polyatomic anion as a result of dissociation of the metal ion therefrom.

The solute of the non-aqueous electrolyte includes, for example, a third polyatomic anion and a third metal ion. Here, the third metal ion is preferably at least one selected from the group consisting of cations of alkali metals and alkaline earth metals. The third polyatomic anion can be selected from those exemplified as the first or second polyatomic anion. It is to be noted that at least part of the third polyatomic anion is preferably the same as the first or second polyatomic anion. A preferred example of the solute is a salt of lithium ion and a fluorocomplex ion.

When the second metal salt is used as the second active material, it is preferable to use the cation common to the second metal salt (the second metal ion), as the third metal ion constituting the solute of the non-aqueous electrolyte. For example, when the second metal salt is a magnesium salt, by allowing a small amount of magnesium ion to be present in the non-aqueous electrolyte, the dissolution of the second metal salt from the second electrode into the non-aqueous electrolyte can be inhibited.

The solvent may be an organic solvent, or an ionic liquid, or a mixture of an organic solvent and an ionic liquid.

The organic solvent is preferably at least one selected from the group consisting of cyclic carbonates, cyclic esters, linear carbonates, cyclic ethers, linear ethers, nitriles, and heterocyclic compounds. Preferred among them is at least one selected from the group consisting of cyclic carbonates, linear carbonates, cyclic esters, and linear esters. One of these organic solvents may be used singly, or two or more of them may be used as a mixture.

Examples of the cyclic carbonates include propylene carbonate (PC), ethylene carbonate (EC), butylene carbonate (BC), vinylene carbonate (VC), vinylethylene carbonate (VEC), and fluoroethylene carbonate (FEC).

Examples of the cyclic esters include γ-butyrolactone (GBL), α-methyl-γ-butyrolactone (MGBL), γ-valerolactone (GVL), furanone (FL), 3-methyl-2(5H)-furanone (MFL), and α-angelicalactone (AGL).

Examples of the linear carbonates include dimethyl carbonate (DMC), ethyl methyl carbonate (EMC), diethyl carbonate (DEC), methyl propyl carbonate (MPuC), methyl butyl carbonate (MBC), and methyl pentyl carbonate (MPeC).

Examples of the cyclic ethers include tetrahydrofuran (THF), 2-methyltetrahydrofuran (MTHF), 2,5-dimethyltetrahydrofuran (dMTHF), 1,3-dioxolane (DIOX), 2-methyl-1,3-dioxolane (MDIOX), tetrahydropyran (THP), and 2-methyl-tetrahydropyran (MTHP).

Examples of the linear ethers include diethyl ether (DEEt), methyl butyl ether (MBE), 1,2-dimethoxyethane (DME), 1-methoxy-2-ethoxyethane (EME), 1,2-diethoxyethane (DEE), diglyme, triglyme, tetraglyme, and polyethylene glycol in which both chain ends are nonprotic.

Examples of the nitriles include acetonitrile (AN), propionitrile (PN), and adiponitrile (AGN).

The organic solvent may be one containing nitrogen element or sulfur elemental, such as N-methylpyrrolidone (NMP) and dimethylsulfoxide (DMSO).

The organic solvent is particularly preferably at least one selected from the group consisting of propylene carbonate, dimethyl carbonate, tetrahydrofuran, and dimethoxyethane.

The solute of the non-aqueous electrolyte may be a salt of the third polyatomic anion and an aliphatic quaternary ammonium ion. Examples of the aliphatic quaternary ammonium ion include tetraethyl ammonium ion (($(C_2H_5)_4N^+$), tetrapropyl ammonium ion (($(C_3H_7)_4N^+$), tetrabutyl ammonium ion (($(C_4H_9)_4N^+$), tetraoctyl ammonium ion (($(C_8H_{17})_4N^+$), triethyl methyl ammonium ion (($(C_2H_5)_3(CH_3)N^+$), tributyl methyl ammonium ion (($(C_4H_9)_3(CH_3)N^+$), trioctyl methyl ammonium ion (($(C_8H_{17})_3(CH_3)N^+$), trimethyl propyl ammonium ion (($(CH_3)_3(C_3H_7)N^+$, TMPA), diethyl dimethyl ammonium ion (($(C_2H_5)_2(CH_3)_2N^+$), diethyl methyl-(2-methoxyethyl)ammonium ion (($(C_2H_5)_2(CH_3)(CH_3OCH_2CH_2)N^+$, DEME), ethyl dimethyl-(2-methoxyethyl)ammonium ion (($(C_2H_5)(CH_3)_2(CH_3OCH_2CH_2)N^+$, MOEDEA), spiro-(1,1)-bipyrrolidinium ion (($(C_4H_8)_2N^+$), butyl methylpyrrolidinium ion (($(C_4H_9)(CH_3)(C_4H_8)N^+$), and propyl methylpiperidinium ion (($(C_3H_7)(CH_3)(C_5H_{10})N^+$).

The solubility of a metal salt having a metal ion and a polyatomic anion is dependent on the kind of the organic solvent constituting the non-aqueous electrolyte. When using an organic solvent that easily dissolves a metal salt, the non-aqueous electrolyte to be used preferably contains a solute at a high concentration. For example, in a non-aqueous electrolyte prepared by mixing lithium tetrafluoroborate ($LiBF_4$) as the solute and tetrahydrofuran (THF) as the solvent in a molar ratio of $LiBF_4/THF=1/2$, $Fe(BF_4)_2$ serving as the active material is hard to dissolve. This applies to when the metal ion constituting the active material is Cu. When an organic solvent is used for the non-aqueous electrolyte, the molar ratio of solute/non-aqueous solvent is preferably 1/6 or more, and more preferably 1/4 or more; and 1/2 or less. In short, the molar ratio of the third metal ion to the organic solvent in the non-aqueous electrolyte is preferably, for example, third metal ion/organic solvent=1/2 to 1/6.

The non-aqueous electrolyte may be an ionic liquid. An ionic liquid is a salt composed of a cation and an anion, and is liquid at room temperature. The combination of a third polyatomic anion and an aliphatic quaternary ammonium ion can give an ionic liquid. For example, diethylmethyl-2-methoxyethyl ammonium tetrafluoroborate ($DEME.BF_4$) is an ionic liquid. Although the ionic liquid may be used together with an organic solvent, not using an organic solvent is preferable because a non-aqueous electrolyte having a high oxidation potential can be provided, and the voltage of the non-aqueous electrolyte secondary battery and the like can be set high. One ionic liquid may be used singly, or two or more ionic liquids may be used in combination.

The non-aqueous electrolyte including an ionic liquid but not including an organic solvent may or may not include a solute containing a third polyatomic anion and a third metal ion. When a solute containing a third polyatomic anion and a third metal ion is dissolved in an ionic liquid, the ionic liquid functions also as a solvent of the non-aqueous electrolyte.

The ionic liquid preferably has a melting point of room temperature, but this is not a limitation, and any salt having a melting point of, for example, 100° C. or less can be used for the non-aqueous electrolyte of a power storage device. Note that it is preferable not to use a chloroaluminate molten salt having an anion such as $AlCl_4^-$ or $Al_2Cl_7^-$.

The cation in the ionic liquid used for an electrochemical energy storage device such as a non-aqueous electrolyte secondary battery and a hybrid capacitor is, for example, imidazolium ion, pyridinium ion, ammonium ion, pyrrolidinium ion, piperidinium ion, and phosphonium ion. Preferred among them is an ion having an aliphatic alkyl group, because it has a broad potential window.

A preferred ion having an aliphatic alkyl group is the above-mentioned aliphatic quaternary ammonium ion. The phosphonium ion is, for example, a quaternary alkylphosphonium ion in which N atom in the alkylammonium ion is substituted by P atom.

The anion in the ionic liquid used for an electrochemical energy storage device such as a non-aqueous electrolyte secondary battery or a hybrid capacitor may be the aforementioned first or second polyatomic anion. Preferred among them are fluorocomplex ions such as $BF_4^-$ and $PF_3(C_2F_5)_3^-$, perchlorate ion ($ClO_4^-$), sulfonate ions such as $CF_3SO_3^-$, and imide ions such as $(CF_3SO_2)_2N^-$ and $(C_2F_5SO_2)_2N^-$.

In the following, an electrochemical energy storage device including an ionic liquid as a non-aqueous electrolyte is described in more details.

When the positive electrode active material is $Cu(BF_4)_2$, and the non-aqueous electrolyte includes $LiBF_4$ as the solute and $(C_2H_5)_2(CH_3)(CH_3OCH_2CH_2)N.BF_4$ (DEME.BF$_4$) as the solvent, the electrochemical reduction and oxidation reactions that occur can be represented, like in the case of Fe, by the reaction formulas (13) and (14). Since the reaction potential of the active material is raised when Fe is substituted by Cu, the energy density of the non-aqueous electrolyte secondary battery and the like is increased.

$$Cu(BF_4)_2 + 2Li^+ + 2e \rightarrow Cu + 2LiBF_4 \quad (13)$$

$$Cu + 2LiBF_4 \rightarrow Cu(BF_4)_2 + 2Li^+ + 2e \quad (14)$$

When the positive electrode active material is replaced with $Cu(CF_3SO_3)_2$, the electrochemical reduction and oxidation reactions represented by the following reaction formulas (15) and (16) occur preferentially.

$$Cu(CF_3SO_3)_2 + 2Li^+ + 2e \rightarrow Cu + 2LiCF_3SO_3 \quad (15)$$

$$Cu + 2LiCF_3SO_3 \rightarrow Cu(CF_3SO_3)_2 + 2Li^+ + 2e \quad (16)$$

In other words, the reaction of copper ion ($Cu^{2+}$) with $BF_4^-$ ion is inhibited. This is because the bond between copper ion and sulfonate ion ($CF_3SO_3^-$) is stronger than that between copper ion and $BF_4^-$.

Preferred examples of the composition of the non-aqueous electrolyte when a lithium salt is selected as the solute to be dissolved in the ionic liquid are the compositions (a) to (i) shown below. According to the compositions below, even when the active material is Cu (in a reduced state), the electrochemical reduction and oxidation reactions proceed with good reversibility. Here, in the case where two or more anions are present in the non-aqueous electrolyte, the anion that preferentially reacts with Cu is one that had been bound to lithium ion (Li$^+$) before dissolution in the ionic liquid. Note that the compositions below are expressed in a molar ratio, and TFSI and FAP are abbreviations of $(CF_3SO_2)_2N^-$ and $PF_3(C_2F_5)_3^-$ respectively.

Li.TFSI/TMPA.TFSI=1/10                (a)

Li.TFSI/DEME.TFSI=1/10               (b)

LiBF$_4$/DEME.BF$_4$=1/10                (c)

Li.FAP/MOEDEA.FAP=1/20              (d)

LiClO$_4$/TMPA.TFSI=1/10               (e)

LiCF$_3$SO$_3$/DEME.TFSI=1/10          (f)

LiCF$_3$SO$_3$/DEME.BF$_4$=1/10         (g)

LiBF$_4$/MOEDEA.FAP=1/20             (h)

LiClO$_4$/MOEDEA.FAP=1/20            (i)

The non-aqueous electrolyte including an ionic liquid may optionally include an organic solvent. It is to be noted, however, the more the organic solvent is, the higher the solubility to the non-aqueous electrolyte of the active material used for an electrochemical energy storage device is. For this reason, the amount of the organic solvent is preferably equimolar amount or less, relative to the amount of the ionic liquid. The above-exemplified organic solvents may be used here without limitation. One organic solvent may be used singly, or two or more organic solvents may be used in combination.

Next, a production method of the metal salt having a polyatomic anion and a metal ion is specifically described.

Description is given first of a first metal salt having iron ion and a fluorocomplex ion. An active material which is hard to dissolve in non-aqueous electrolyte can be electrochemically produced. A non-aqueous electrolyte including an ionic liquid is hard to dissolve active material, and therefore, can be suitably used for electrochemically producing an active material. For example, by electrochemically oxidizing an iron wire in a non-aqueous electrolyte in which the molar ratio of LiBF$_4$/DEME.BF$_4$=1/10, an active material in which the molar ratio of Fe/BF$_4$=1/2(Fe(BF$_4$)$_2$) can be efficiently produced.

Likewise, a non-aqueous electrolyte including lithium tetrafluoroborate (LiBF$_4$) as the solute and tetrahydrofuran (THF) as the organic solvent is hard to dissolve Fe(BF$_4$)$_2$ serving as an active material. This applies to when the metal ion constituting the active material is Cu. Therefore, for example, by electrochemically oxidizing an iron wire in a non-aqueous electrolyte in which the molar ratio of LiBF$_4$/THF=1/10, Fe(BF$_4$)$_2$ can be produced.

Description is given next of a second metal salt having magnesium ion and a fluorocomplex ion. The salt having magnesium ion and a fluorocomplex ion can be produced by electrochemically oxidizing magnesium metal in a non-aqueous electrolyte containing the fluorocomplex ion.

For example, lithium tetrafluoroborate (LiBF$_4$) or tetrabutylammonium tetrafluoroborate (($C_4H_9$)$_4$NBF$_4$) is dissolved in tetrahydrofuran (THF), to prepare a non-aqueous electrolyte. Next, magnesium metal is soaked in the prepared non-aqueous electrolyte, and an oxidation current is passed between the magnesium metal and a counter electrode. The electric potential of the magnesium metal at the time of passing an oxidation current is set higher than the overvoltage in the reaction represented by the formula (8).

When the non-aqueous electrolyte contains lithium ion, an electrically conductive material such as metal can be used as the counter electrode, and in this case, lithium metal precipitates on the counter electrode. When the non-aqueous electrolyte contains tetrabutylammonium ion, graphite can be used as the counter electrode. In this case, the tetrabutylammonium ion is intercalated between graphite layers. A white compound (second metal salt) precipitates on the surface of the magnesium metal.

Alternatively, the second metal salt can be obtained by, for example, dissolving tetrabutylammonium tetrafluoroborate (($C_4H_9$)$_4$NBF$_4$) in tetrahydrofuran (THF), to prepare a non-aqueous electrolyte, adding magnesium chloride (MgCl$_2$) to the prepared non-aqueous electrolyte, and stirring them together. In this process, [($C_4H_9$)$_4$N]$_2$[MgCl$_4$].2THF forms and precipitates, and a solution in which Mg(BF$_4$)$_2$ is dissolved is obtained. The solution is filtered to remove the precipitate therefrom, and THF is vaporized therefrom, whereby a white compound can be obtained.

Alternatively, magnesium fluoride (MgF$_2$) may be added to a diethyl ether solution containing boron trifluoride diethylether complex (BF$_3$.C$_4$H$_{10}$O), and stirred together. The magnesium fluoride reacts with boron trifluoride, and thus, a white compound can be obtained.

In the case of utilizing a second metal salt having magnesium ion and a fluorocomplex ion, the second metal salt is preferably slightly dissolved in the non-aqueous electrolyte. Specifically, the second metal salt is preferably dissolved in the non-aqueous electrolyte such that the molar ratio of magnesium ion/non-aqueous solvent in the electrolyte is greater than 0 (zero), and is equal to or smaller than 1/50, and preferably equal to or smaller than 1/100. When the second metal salt is slightly dissolved in the non-aqueous electrolyte as above, the fluorocomplex ion is easily bound to and separated from magnesium ion.

The above-mentioned cyclic ethers and linear ethers are preferable as the non-aqueous solvent that slightly dissolves the second metal salt containing magnesium ion and a fluorocomplex ion. Among them, cyclic ethers are preferred, tetrahydrofuran (THF) and 2-methyltetrahydrofuran (MTHF) are more preferred, and tetrahydrofuran (THF) is particularly preferred.

The second metal salt having magnesium ion and a fluorocomplex ion may be an adduct with the non-aqueous solvent included in the non-aqueous electrolyte. For example, when the non-aqueous solvent is tetrahydrofuran (THF), the second metal salt may form a compound (adduct) represented by Mg(BF$_4$)$_2$.6THF.

The first electrode (e.g., positive electrode) including a first metal salt, and the second electrode (e.g., negative electrode) including a second metal salt can be each produced from a material mixture prepared by mixing a first metal salt powder as the first active material, or a second metal salt powder as the second active material, with an electrically conductive powder such as acetylene black, and a binder such as polyvinylidene fluoride. The material mixture may be compacted in the mixed powder state, or may be dispersed into a dispersion medium such as N-methyl-2-pyrrolidone (NMP) to form a slurry. The slurry is applied onto a surface of an electrically conductive foil (current collector). The conductive foil used for the positive electrode is iron, copper, aluminum, or an alloy mainly composed of at least one of them. The conductive foil used for the negative electrode is iron, copper, or an alloy mainly composed of at least one of them.

More specifically, the positive electrode for a non-aqueous electrolyte secondary battery or a hybrid capacitor can be produced from a material mixture prepared by mixing a first metal salt as the positive electrode active material, with a conductive powder such as acetylene black, and a binder such as polyvinylidene fluoride.

The negative electrode for a non-aqueous electrolyte secondary battery or a hybrid capacitor can be produced from a material mixture prepared by mixing a second metal salt or magnesium metal powder as the negative electrode active material, with a conductive powder such as acetylene black, and a binder such as polyvinylidene fluoride. The magnesium metal used as the negative electrode active material may be in the form of foil or plate.

The dispersion medium in which the material mixture is to be dispersed is preferably an organic solvent (particularly, an ether-based solvent), or an ionic liquid including a fluorocomplex ion.

EXAMPLES

The present invention is specifically described below by way of Examples. The following Examples, however, should not be construed as limiting the invention.

The experiments below were all conducted in a glove box with argon atmosphere.

Example 1

A material including iron ion (Fe$^{2+}$) and a polyatomic anion (BF$_4^-$) in a molar ratio of Fe$^{2+}$/BF$_4^-$=1/2 was electrochemically synthesized. The degree of separation (hysteresis) between the electrochemical oxidation and reduction potentials of the material was evaluated.

A non-aqueous electrolyte containing LiBF$_4$ (available from Kishida Chemical Co., Ltd.) and tetrahydrofuran (THF, available from Kishida Chemical Co., Ltd.) in a molar ratio of LiBF$_4$/THF=1/10 was prepared.

An iron wire of 1 mm in diameter (available from The Nilaco Corporation) was prepared as a working electrode.

A lithium foil press-fitted to a nickel lead (available from Honjo Metal Co., Ltd.) was prepared as a counter electrode and a reference electrode.

The working electrode, reference electrode, and counter electrode were soaked in the non-aqueous electrolyte, and cyclic voltammetry was performed at a sweep rate of 1 mV/sec within the potential range at the working electrode of 2.0 to 4.0 V. At this time, a large dissolution current of the iron wire passed through the working electrode. After 8 cycles, the working electrode was washed with tetrahydrofuran, and the surface thereof was observed with a scanning electron microscope. The result confirmed the presence of a substance precipitated on the surface.

FIG. 1 is a micrograph of the surface of the counter electrode.

Figure 2:
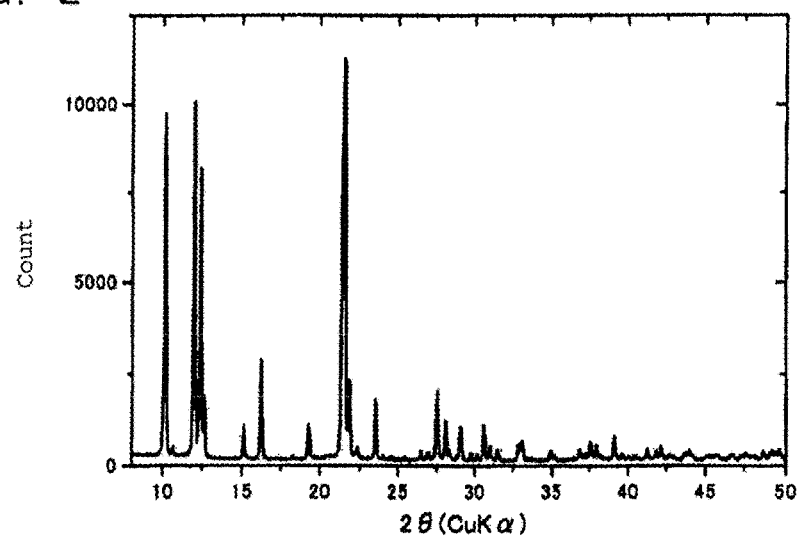

FIG. 2 is an X-ray diffraction pattern of the precipitated substance.

The X-ray diffraction pattern revealed that the precipitated substance was a new substance. The composition of the new substance was analyzed by inductively coupled plasma (ICP) emission spectrometry, ion chromatography, thermal analysis, and the like, and it was identified as Fe(BF$_4$)$_2$.6THF (an adduct of Fe(BF$_4$)$_2$ and THF).

Next, electrochemical oxidation and reduction reactions of Fe(BF$_4$)$_2$.6THF were allowed to proceed, to evaluate the degree of hysteresis. Specifically, the working electrode with Fe(BF$_4$)$_2$.6THF adhering thereto was soaked in a newly prepared LiBF$_4$/THF=1/10 non-aqueous electrolyte, and 8 cycles of cyclic voltammetry was performed at a sweep rate of 1 mV/sec within the potential range of 2.0 to 3.2 V. The reason why the non-aqueous electrolyte was replaced with a new one was to prevent electrochemical oxidation and reduction of iron ion from proceeding in parallel, by using a non-aqueous electrolyte in which no iron ion is dissolved.

Figure 3:
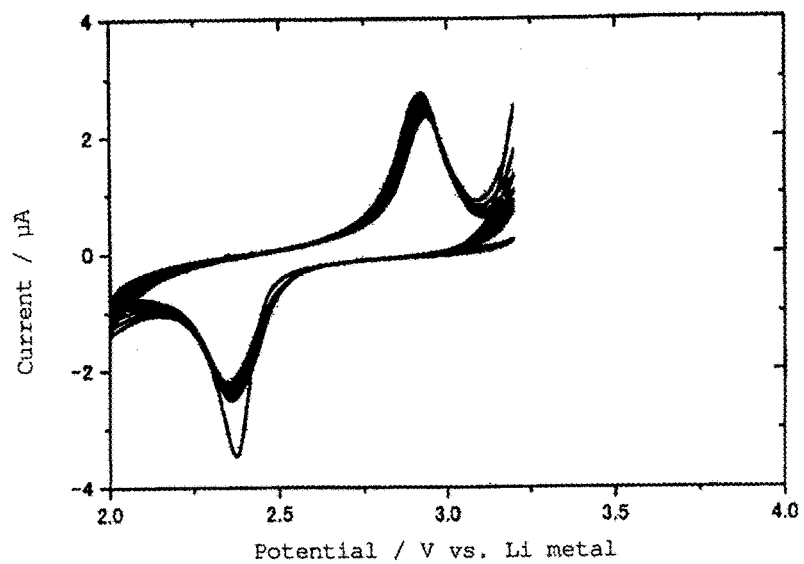

FIG. 3 is a cyclic voltammogram of Fe(BF$_4$)$_2$.6THF. The electrochemical reaction at this time can be represented by the reaction formula (A). The electric capacity of Fe(BF$_4$)$_2$.6THF is 81 mAh/g.

$$\text{Fe(BF}_4)_2\cdot 6\text{THF} + 2\text{Li}^+ + 2e \leftrightarrow \text{Fe} + 2\text{LiBF}_4 + 6\text{THF} \qquad (A)$$

In FIG. 3, the peak-to-peak separation between oxidation and reduction waves is approximately 0.5 V, showing that the hysteresis is small. This indicates that Fe(BF$_4$)$_2$.6THF can be used to allow the electrode reaction of the electrochemical energy storage device to proceed very smoothly.

Example 2

The molar ratio of $LiBF_4/THF$ in the non-aqueous electrolyte was changed, and a material including iron ion ($Fe^{2+}$) and a polyatomic anion ($BF_4^-$) in a molar ratio of $Fe^{2+}BF_4^-=1/2$ was electrochemically synthesized in the manner similar to Example 1. The degree of hysteresis between the electrochemical oxidation and reduction potentials of the material was evaluated in the manner similar to Example 1.

Figure 4:
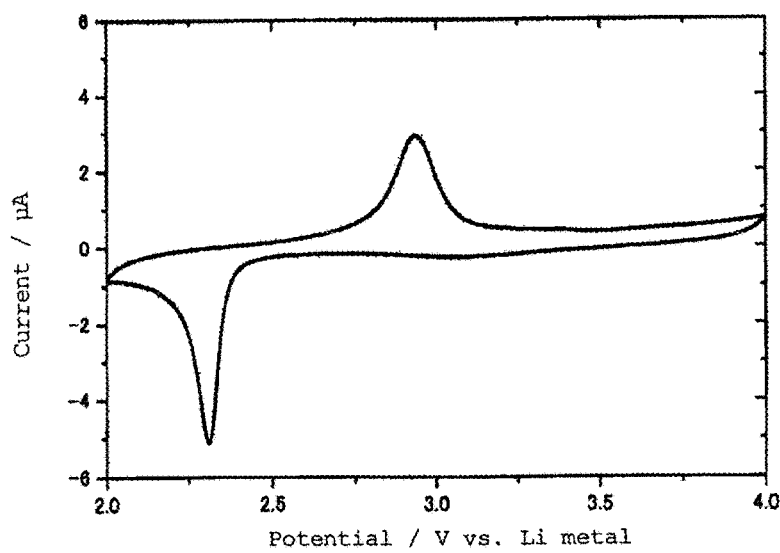

Specifically, instead of the non-aqueous electrolyte in which the molar ratio of $LiBF_4/THF=1/10$, a non-aqueous electrolyte with high solute concentration in which $LiBF_4/THF=1/2$ was used. Likewise in Example 1, an iron wire was used as the working electrode, and a lithium foil was used as the reference electrode and the counter electrode. Cyclic voltammetry was performed at a sweep rate of 1 mV/sec within the potential range of 2.0 to 4.0 V. FIG. 4 is a cyclic voltammogram at the $8^{th}$ cycle.

According to FIG. 4, with a $LiBF_4/THF=1/2$ electrolyte, no significant flow of dissolution current from the iron wire was observed even when the potential of the working electrode was swept up to 4 V. On the other hand, electrochemical oxidation and reduction waves appeared reversibly. FIG. 4 suggests that $Fe(BF_4)_2$ covering the surface of the working electrode is hard to dissolve in the non-aqueous electrolyte and is hard to decompose even at high potentials.

During the experiment, no precipitation of $LiBF_4$ was observed. If the reaction of the iron wire had proceeded to the left side in the reaction formula (A), $LiBF_4$ in the non-aqueous electrolyte must have been saturated and precipitated. The above result indicates that THF in the non-aqueous electrolyte with high solute concentration is hard to form an adduct with $Fe(BF_4)_2$, and the reaction represented by the formula (B) proceeded:

$$Fe(BF_4)_2+2Li^++2e \leftrightarrow Fe+2LiBF_4 \qquad (B).$$

The electric capacity of $Fe(BF_4)_2$ is 234 mAh/g, which is about 1.6 times as high as that of $Li_{0.5}CoO_2$.

Note that similar results can be obtained with a non-aqueous electrolyte in which the organic solvent is dimethoxyethane (DME), and $LiBF_4/DME=1/2$.

Example 3

Figure 5:
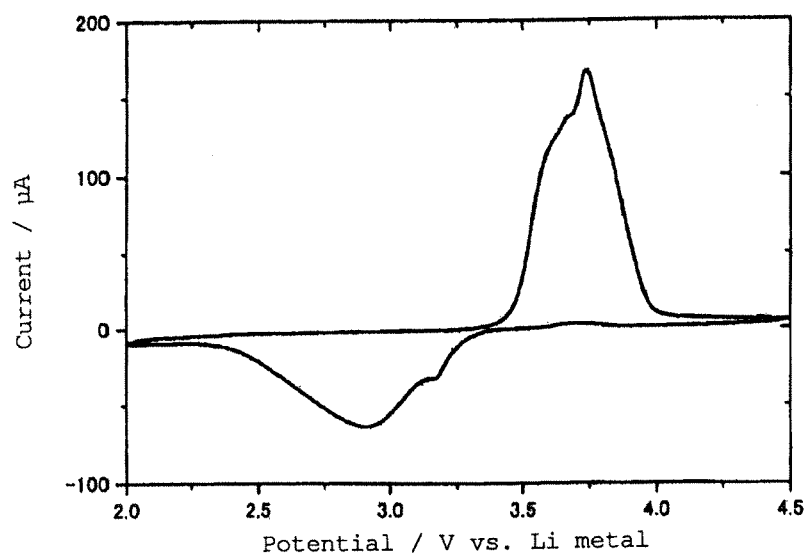

Next, likewise in Example 2, a non-aqueous electrolyte of $LiBF_4/THF=1/2$ was used. As for the working electrode, instead of the iron wire, a copper wire of 1 mm in diameter (available from The Nilaco Corporation) was used. Cyclic voltammetry was performed at a sweep rate of 1 mV/sec within the potential range of 2.0 to 4.5 V. FIG. 5 is a cyclic voltammogram at the $8^{th}$ cycle.

As clear from FIG. 5, with a copper wire, too, oxidation and reduction reactions in which the hysteresis is small proceed. A plurality of peaks can be observed in each of the oxidation and reduction waves in FIG. 5, indicating that the reactions represented by the reaction formulas (C), (D) and (E) proceeded.

$$Cu(BF_4)_2+2Li^++2e \leftrightarrow Cu+2LiBF_4 \qquad (C)$$

$$Cu(BF_4)_2+Li^++e \leftrightarrow CuBF_4+LiBF_4 \qquad (D)$$

$$CuBF_4+Li^++e \leftrightarrow Cu+LiBF_4 \qquad (E)$$

Comparison between FIGS. 4 and 5 shows that, by changing the metal ion from ion to copper, the potential of the working electrode is increased by approximately 1 V. The electric capacity of $Cu(BF_4)_2$ is 226 mAh/g, which is about 1.6 times as high as that of $Li_{0.5}CoO_2$.

Example 4

Figure 6:
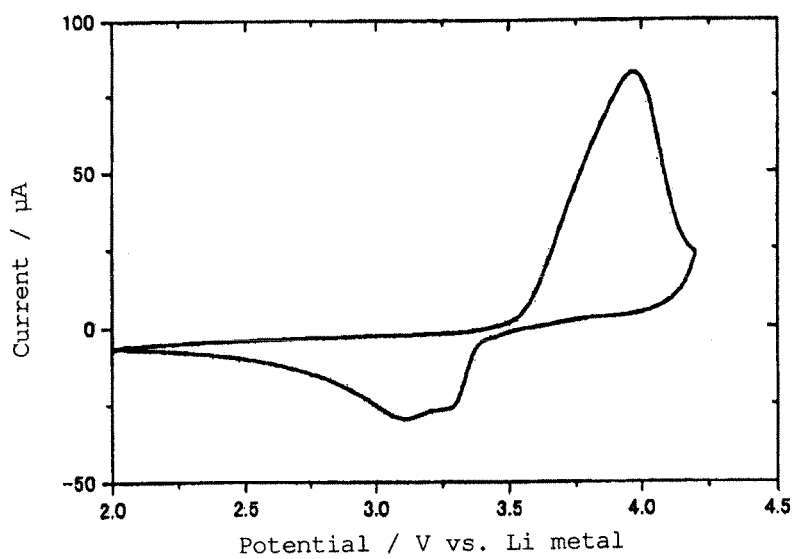

The organic solvent of the non-aqueous electrolyte was changed from THF to propylene carbonate (PC, available from Kishida Chemical Co., Ltd.), which is one of cyclic carbonates. Specifically, with the use of a non-aqueous electrolyte in which the molar ratio of $LiBF_4/PC=1/2$, a copper wire serving as the working electrode, and a lithium foil serving as the reference electrode and the counter electrode, cyclic voltammetry was performed at a sweep rate of 1 mV/sec within the potential range of 2.0 to 4.2 V. FIG. 6 is a cyclic voltammogram at the $8^{th}$ cycle.

As clear from FIG. 6, in the case of using PC, too, oxidation and reduction reactions in which the hysteresis is small proceed. Note that similar results can be obtained when ethylene carbonate is used as the cyclic carbonate, and when dimethyl carbonate, one of chain carbonates, is used.

Example 5

The solute of the non-aqueous electrolyte was changed to lithium bis(trifluoromethanesulfonyl)imide containing bis(trifluoromethanesulfonyl)imide ion (TFSI ion) (LiTFSI, $(CF_3SO_2)_2NLi$, available from Kishida Chemical Co., Ltd.). Specifically, a non-aqueous electrolyte in which the molar ratio of $LiTFSI/THF=1/2$ was prepared. With the use of an iron wire serving as the working electrode, and a lithium foil serving as the reference electrode and the counter electrode, 2 cycles of cyclic voltammetry was performed at a sweep rate of 1 mV/sec within the potential range of 2.0 to 4.0 V, to allow an active material containing iron to precipitate on the surface of the working electrode.

Figure 7:
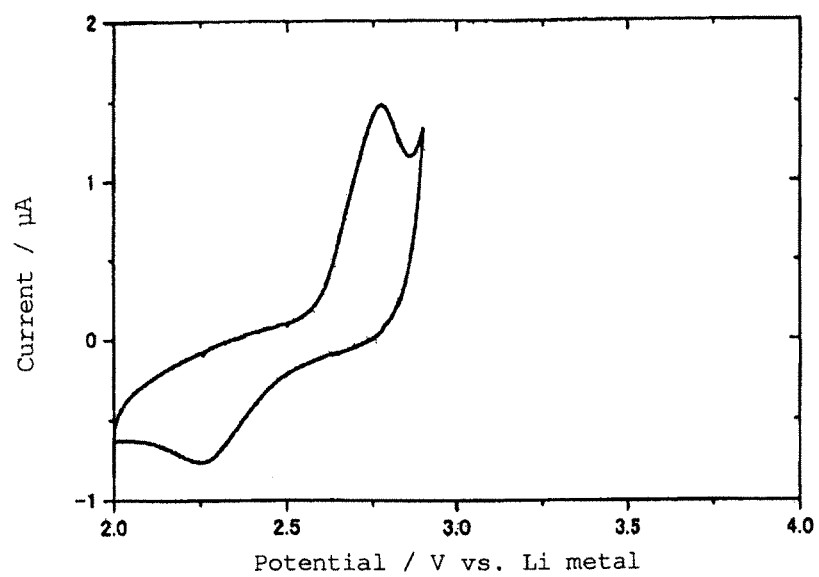

Subsequently, the working electrode was soaked in a newly prepared non-aqueous electrolyte having the same composition as above, 20 cycles of cyclic voltammetry was performed at a sweep rate of 1 mV/sec within the potential range of 2.0 to 2.9 V. FIG. 7 is a cyclic voltammogram at the $20^{th}$ cycle.

As clear from FIG. 7, with a non-aqueous electrolyte including LiTFSI, too, the electrochemical oxidation and reduction reactions of iron wire proceed favorably. During this, a conversion reaction is considered to proceed in which a metal salt containing iron ion and TFSI ion is formed on the surface of the iron wire. The electric capacity of $Fe(TFSI)_2$ is 160 mAh/g, which is about 1.1 times as high as that of $Li_{0.5}CoO_2$.

Example 6

A material containing magnesium ion ($Mg_2^+$) and a polyatomic anion ($BF_4^-$) was electrochemically synthesized, and the degree of separation (hysteresis) between the electrochemical oxidation and reduction potentials of the material was evaluated, in the following manner.

First, a non-aqueous electrolyte including $LiBF_4$ (available from Kishida Chemical Co., Ltd.) and tetrahydrofuran (THF, available from Kishida Chemical Co., Ltd.) in a molar ratio of $LiBF_4/THF=1/10$ was prepared.

A magnesium ribbon (available from Kojundo Chemical Lab. Co., Ltd.) with a nickel lead connected thereto via indium was used as the working electrode. The working electrode was put into a bag of a polypropylene separator (Celgard®, available from Polypore Inc.). A counter electrode and a reference electrode were prepared in the same manner as in Example 1.

The working electrode, reference electrode, and counter electrode were soaked in the non-aqueous electrolyte, and a 1 mA anodic current was passed through the working electrode for 20 hours. As a result, there formed a substance precipitated and accumulated on the surface of the magnesium ribbon, and the separator bag swelled. The precipitated substance accumulated in the separator bag was washed with THF, and LiBF$_4$ was separated therefrom, and as a result, a white substance was obtained. The white substance was analyzed by, for example, ion chromatography. The result found that it was a new substance having a composition of Mg(BF$_4$)$_2$.6THF. The foregoing shows that the reaction represented by the formula (F) proceeded at the working electrode:

$$Mg+2BF_4^-+6THF \rightarrow Mg(BF_4)_2.6THF+2e \qquad (F).$$

The solubility of Mg(BF$_4$)$_2$.6THF was 1/100 or less, in terms of the Mg/THF molar ratio, with taken into account the quantity of anode electricity in producing Mg(BF$_4$)$_2$.6THF, the actual yield of Mg(BF$_4$)$_2$.6THF, the amount of THF used for washing, and other factors.

Example 7

Examination was made to confirm that magnesium metal can be electrochemically produced in a non-aqueous electrolyte, from Mg(BF$_4$)$_2$.6THF synthesized in Example 6. In this Example also, a non-aqueous electrolyte in which the molar ratio of LiBF$_4$/THF=1/10 was used.

First, Mg(BF$_4$)$_2$.6THF and diglyme (available from Kishida Chemical Co., Ltd.) were mixed into a paste, and was applied onto an iron foil (available from The Nilaco Corporation). The applied paste was dried in a reduced pressure at room temperature, and an iron lead was resistance-welded thereto, to form a working electrode including Mg(BF$_4$)$_2$. As for the counter electrode and the reference electrode, a lithium metal was used as in Example 1.

The working electrode, reference electrode, and counter electrode were soaked in the non-aqueous electrolyte, and held for 72 hours, with the potential of the working electrode kept at 0.6 V relative to the reference electrode. The potential of 0.6 V is a potential at which an alloy of magnesium and lithium is not formed through reduction of lithium ion in the non-aqueous electrolyte.

Figure 8:
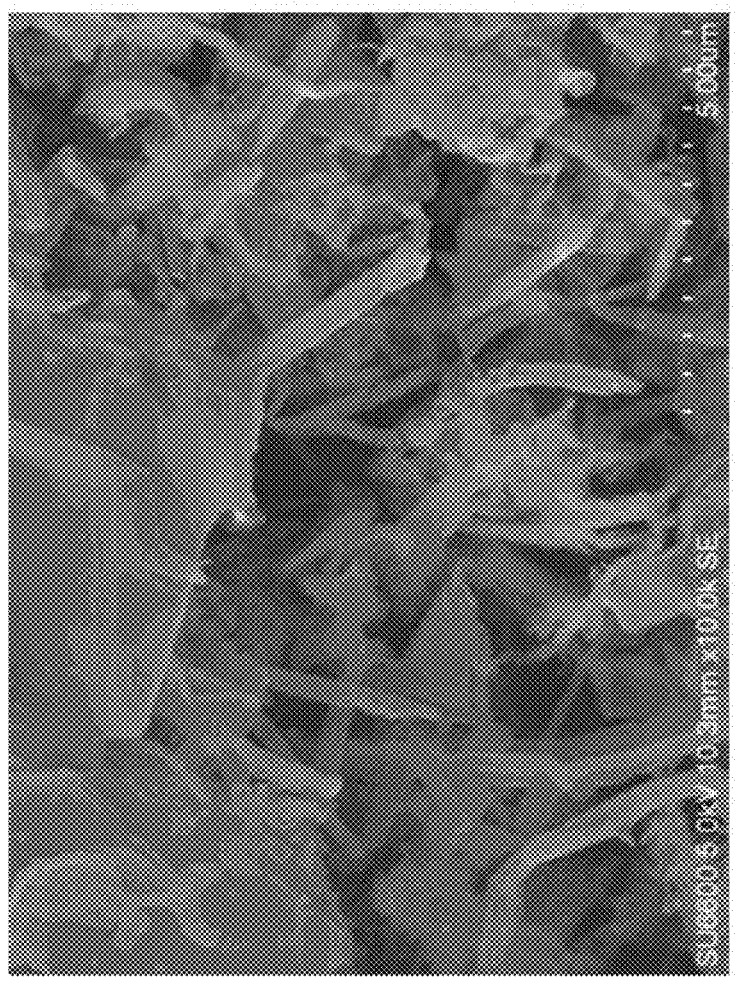
FIG. 8 A scanning electron micrograph of magnesium metal produced when a cathodic current is passed through an electrode used in one Example of the present invention FIG. 9 Discharge curves of an iron wire when subjected to constant-current charge and discharge in a $LiBF_4$/DEME.$BF_4$ electrolyte FIG. 10 Discharge curves of a $Cu(BF_4)_2$ electrode when subjected to constant-current charge and discharge in a $LiBF_4$/DEME.$BF_4$ electrolyte FIG. 11 Discharge curves of a cell when subjected to constant-current charge and discharge, the cell including a lithium foil, a copper foil, and an electrolyte membrane interposed therebetween, the electrolyte membrane containing a Li.FAP/MOEDEA.FAP=1/20 electrolyte FIG. 12 A cyclic voltammogram of a bismuth wire in a $LiBF_4$/DEME.$BF_4$=1/10 electrolyte FIG. 13 Discharge curves of a bismuth powder electrode when subjected to constant-current charge and discharge in a $LiBF_4$/DEME.$BF_4$=1/10 electrolyte FIG. 14 Discharge curves of a $Cu(CF_3SO_3)_2$ electrode when subjected to constant-current charge and discharge in a $LiBF_4$/DEME.$BF_4$=1/10 electrolyte FIG. 15 Discharge curves of a $Cu(ClO_4)_2$ electrode when subjected to constant-current charge and discharge in a $LiClO_4$/TMPA.TFSI=1/10 electrolyte FIG. 16 A schematic view for explaining an exemplary configuration of an electrochemical energy storage device

The working electrode after having held at 0.6 V was washed with THF, and dried. The dry working electrode was observed with a scanning electron microscope, and a plate- or whisker-like precipitated substance as shown in FIG. 8 was seen. X-ray photoelectron spectroscopy was performed to check the magnesium status in the precipitated substance, and a binding energy peak was observed at 49 eV. This shows that Mg(BF$_4$)$_2$.6THF was reduced to magnesium metal. Specifically, the reaction represented by the formula (G) proceeded at the working electrode:

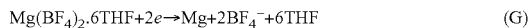

$$Mg(BF_4)_2.6THF+2e \rightarrow Mg+2BF_4^-+6THF \qquad (G)$$

Examples 6 and 7 show that, in a non-aqueous electrolyte containing BF$_4^-$, the production of magnesium metal through electrochemical reduction and the production of a magnesium compound (second metal salt) through oxidation of magnesium metal are possible. In other words, without the need of using a non-aqueous electrolyte having magnesium ion conductivity, magnesium metal can be used as the negative electrode material. One possible reason why the reaction to produce magnesium metal from a magnesium compound and the reaction in the opposite direction proceed in the non-aqueous electrolyte is that the magnesium compound slightly dissolves in the non-aqueous electrolyte.

Note that although suitable as an active material for a non-aqueous electrolyte secondary battery, Mg(BF$_4$)$_2$ is difficult to obtain by heating its hexahydrate salt, Mg(BF$_4$)$_2$.6H$_2$O. According to the present invention, however, Mg(BF$_4$)$_2$ can be easily obtained, and therefore, a secondary battery utilizing magnesium metal for a negative electrode can be easily provided.

Example 8

A hybrid capacitor was produced, using a positive electrode including activated carbon powder, and a negative electrode including Mg(BF$_4$)$_2$.6THF synthesized in Example 6.

(i) Positive Electrode

Phenolic resin-based activated carbon powder having a specific surface area of 1700 m$^2$/g, acetylene black serving as a conductive agent, ammonium salt of carboxymethyl cellulose serving as a binder, and water and methanol serving as a dispersion medium were mixed in a weight ratio of 10/2/1/100/40, to prepare a paste. The paste was applied onto one side of a 20-μm-thick current collector made of aluminum foil, and dried, to form a positive electrode having an 80-μm-thick activated carbon powder layer. The positive electrode was cut in the size of 30 mm×30 mm, and ultrasonically welded to a 0.5-mm-thick aluminum current collector plate provided with a lead.

(ii) Negative Electrode

Mg(BF$_4$)$_2$.6THF, copper powder (available from Kojundo Chemical Lab. Co., Ltd.) serving as a conductive agent, and diglyme serving as a thickener were mixed in a weight ratio 80/10/10, to prepare a paste. The paste was applied onto one side of a 15-μm-thick current collector made of electrolytic copper foil, and dried and pressed, to form a negative electrode having a 10-μm-thick active material layer. The negative electrode was cut in the size of 30 mm×30 mm, and ultrasonically welded to a 0.5-mm-thick copper current collector plate provided with a lead.

(iii) Non-Aqueous Electrolyte

A non-aqueous electrolyte in which the molar ratio of LiBF$_4$/THF=1/10 was prepared.

(iv) Capacitor

The produced positive and negative electrodes were soaked in the non-aqueous electrolyte, and held for 1 hour, with a voltage of 2.3 V being applied across the electrodes. Thereafter, discharge was performed at a current of 1 mA to 1.3 V, to measure a discharge capacity A. Subsequently, similarly to the above, the voltage across the electrodes was held at 2.3 V, and discharge was performed at a current of 10 mA to 1.3 V, to measure a discharge capacity B. The measured discharge capacity B was used to calculate a ratio B/A, which was 0.994.

Comparative Example 1

A hybrid capacitor was fabricated in the same manner as in Example 8, except for using lithium metal as the negative electrode.

The produced positive electrode having an activated carbon powder layer and a negative electrode made of lithium metal were soaked in the non-aqueous electrolyte, and held for 1 hour, with a voltage of 3.3 V being applied across the electrodes. Thereafter, discharge was performed at a current of 1 mA to 2.3 V, to measure a discharge capacity A'. Subsequently, similarly to the above, the voltage across the electrodes was held at 3.3 V, and discharge was performed at a current of 10 mA to 2.3 V, to measure a discharge capacity B'. The measured discharge capacity B' was used to calculate B'/A', which was 0.939.

Comparison of the discharge capacity ratio between the hybrid capacitors of Example 8 and Comparative Example 1 shows that the hybrid capacitor of Example 8 is excellent in high-speed discharge. This is because in the hybrid capacitor of Example 8, $BF_4^-$ moves in the non-aqueous electrolyte, while in the hybrid capacitor of Comparative Example 1, $Li^+$ moves together with $BF_4^-$, and the mobility of $Li^+$ solvated with tetrahydrofuran is low.

Example 9

A non-aqueous electrolyte secondary battery including a positive electrode containing polythiophene, and a negative electrode containing $Mg(BF_4)_2 \cdot 6THF$ was fabricated, in the following manner.

The polythiophene was prepared by electrolytically polymerizing thiophene in an acetonitrile solution containing thiophene. First, a solution containing thiophene (Th, available from Sigma-Aldrich Japan K.K.), lithium tetrafluoroborate ($LiBF_4$), and acetonitrile (AN, available from Kishida Chemical Co., Ltd.) in a molar ratio of Th/$LiBF_4$/AN=1/1/100 was prepared. Next, two platinum nets (available from The Nilaco Corporation) and a reference electrode made of lithium metal were soaked in the solution, and a potential of 4.5 V was applied through one of the platinum nets. At this time, an anodic current of 17 mA passed trough the net, and the production of polythiophene was observed. Upon elapse of 300 seconds, the application of potential was stopped, and a cathodic current of 0.1 mA was passed through the net. The quantity of electricity produced until the potential reached 3.0 V was 0.12 mAh per cm² of the platinum net.

Magnesium metal was used as a negative electrode. Specifically, a negative electrode was prepared by polishing a 25 mm×25 mm magnesium foil (available from Alfa Aesar) with a knife, then a nickel lead was connected thereto.

The positive electrode and the negative electrode were integrated, with a 25-μm-thick polypropylene porous film (Celgard®, available from Polypore Inc.) interposed therebetween, into an electrode group.

A non-aqueous electrolyte containing tetrabutylammonium tetrafluoroborate (($Bu)_4NBF_4$, available from Kishida Chemical Co., Ltd.) and THF, in a molar ratio of $(Bu)_4NBF_4$/THF=1/10 was prepared here.

The electrode group was soaked in the non-aqueous electrolyte, and charge and discharge were performed at a constant current of 0.1 mA within the range of 2.0 to 3.2 V. The quantity of electricity produced was 0.09 mAh per cm² of the platinum net.

Example 10

Examination was made to check for the case where the non-aqueous electrolyte is an ionic liquid.

First, a non-aqueous electrolyte including $LiBF_4$ (available from Kishida Chemical Co., Ltd.) and $DEME \cdot BF_4$ (available from Kanto Chemical Co., Inc.) in a molar ratio of $LiBF_4$/$DEME \cdot BF_4$=1/10 was prepared. DEME is diethylmethyl-(2-methoxyethyl)ammonium ion (($C_2H_5)_2(CH_3)(CH_3OCH_2CH_2)N^+$).

An iron wire of 1 mm in diameter (available from The Nilaco Corporation) was prepared as the working electrode. A lithium foil press-fitted to a nickel lead (available from Honjo Metal Co., Ltd.) was prepared as the counter electrode and the reference electrode.

The working electrode, reference electrode, and counter electrode were soaked in the non-aqueous electrolyte, and the potential of the working electrode was held at 3.2 V, to allow a substance containing iron ion ($Fe^{2+}$) and a polyatomic anion ($BF_4^-$) to precipitate on the surface of the working electrode. The resultant substance was analyzed by ICP emission spectrometry, ion chromatography, and thermal analysis, and it was identified as $Fe(BF_4)_2$.

Next, the potential of the working electrode with $Fe(BF_4)_2$ precipitated thereon was held at 3.2 V, and then, with the working electrode taken as the positive electrode, discharge was performed in the $LiBF_4$/$DEME \cdot BF_4$=1/10 non-aqueous electrolyte at a constant current of 5 μA, until the potential of the working electrode dropped to 2.0 V.

Figure 9:
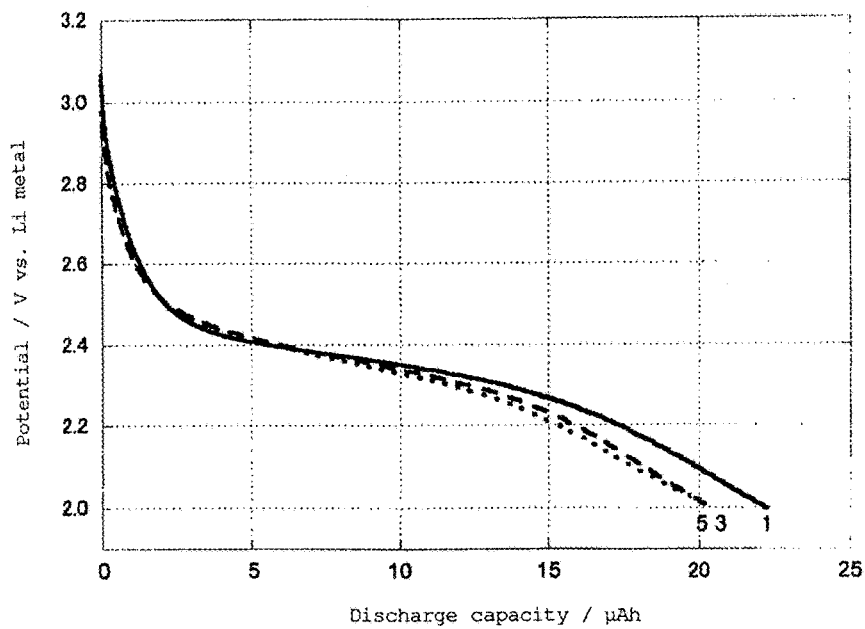

FIG. 9 shows discharge curves at the $1^{st}$, $3^{rd}$ and $5^{th}$ cycles, one cycle consisting of holding at a constant potential at 3.2 V and constant-current discharging at 5 μA. The reaction that occurs here is similar to that in Example 2, and is represented by the reaction formula (B1):

$$Fe(BF_4)_2 + 2Li^+ + 2e \rightarrow Fe + 2LiBF_4 \quad (B1).$$

On FIG. 9, the flat potential during discharge is 2.4 V, and the difference (hysteresis) from the charge potential is 0.8 V. This shows an improvement from the potential difference in the case of $FeF_2$ (1 V or more at 60° C.)

Example 11

The iron wire uses as the working electrode was replaced with a copper wire of 1 mm in diameter (available from The Nilaco Corporation), and experiment similar to in Example 10 was performed. As for the non-aqueous electrolyte, reference electrode, and counter electrode, the same ones as used in Example 10 were used. In this example, the working electrode, reference electrode, and counter electrode were soaked in the non-aqueous electrolyte, and the potential of the working electrode was held at 4.5 V, to allow $Cu(BF_4)_2$ to precipitate on the surface of the working electrode.

Thereafter, $Cu(BF_4)_2$, acetylene black (AB) serving as a conductive agent, and polytetrafluoroethylene powder (PTFE) serving as a binder were kneaded in a mass ratio of $Cu(BF_4)_2$/AB/PTFE=70/20/10, and pressed between a pair of rollers, into a sheet. A 3-mm disc was punched out from the sheet, and press-fitted to a 100-mesh platinum net, to give a test electrode. The test electrode corresponds to a positive electrode for a battery or a hybrid capacitor.

Figure 10:
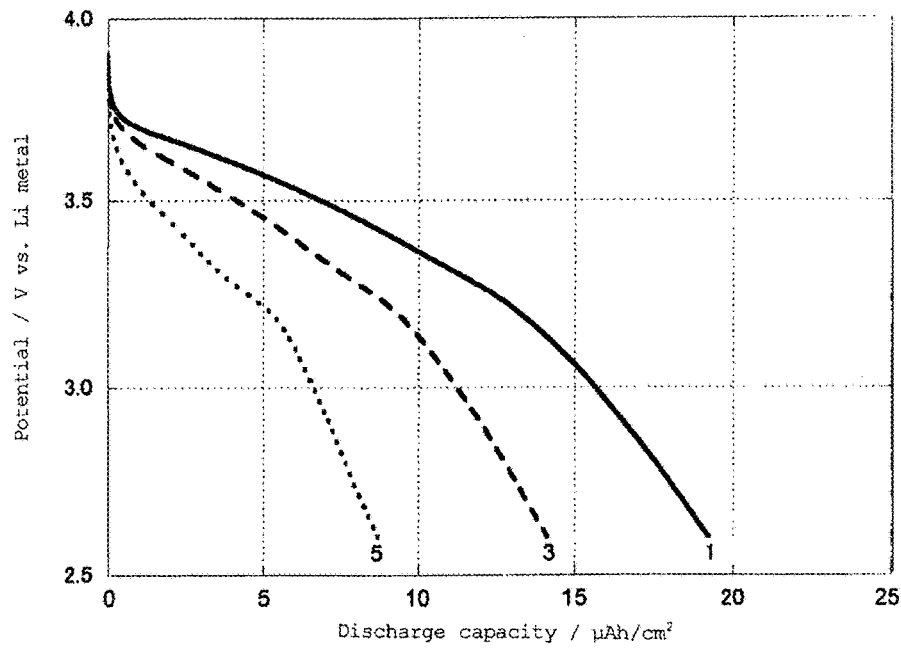

The obtained test electrode was used to perform charge and discharge at a constant current of 10 μA/cm² within the range of 2.6 to 4.2 V. FIG. 10 shows discharge curves at the $1^{st}$, $3^{rd}$ and $5^{th}$ cycles. FIG. 10 shows that discharge occurred at an average potential of approximately 3.4 V. This potential is about 1 V higher than that in the case of $Fe(BF_4)_2$, The discharge curves have a shoulder, suggesting that the reactions represented by the formulas (C1), (D1) and (E1) proceeded.

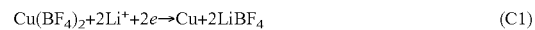

$$Cu(BF_4)_2 + 2Li^+ + 2e \rightarrow Cu + 2LiBF_4 \quad (C1)$$

$$Cu(BF_4)_2 + Li^+ + e \rightarrow CuBF_4 + LiBF_4 \quad (D1)$$

$$CuBF_4 + Li^+ + e \rightarrow Cu + LiBF_4 \quad (E1)$$

Example 12

Examination was made on the electrochemical behavior when $PF_3(C_2F_5)_3^-$ (FAP) was used as the polyatomic anion of the active material and as the electrolyte (ionic liquid).

First, a lithium foil press-fitted to nickel ribbon was prepared as an electrode A. Next, graphite powder (available from Sigma-Aldrich Co. LLC.) and styrene-butadiene rubber were kneaded together into a sheet, as an electrode B. The electrodes A and B were disposed face to face, with a glass fiber separator interposed therebetween, to form a cell. The glass fiber separator was impregnated with a non-aqueous electrolyte, $(C_2H_5)(CH_3)_2(CH_3OCH_2CH_2)N.PF_3(C_2F_5)_3$ (MOEDEA.FAP). MOEDEA is ethyldimethyl-(2-methoxyethyl)ammonium ion $((C_2H_5)(CH_3)_2CH_3OCH_2CH_2)N^+)$.

Subsequently, an anodic current of 10 μA/cm² was passed through the electrode A, to cause lithium ion (Li⁺) to be eluted from the electrode A into the glass fiber separator. This allowed a reaction to proceed in which the MOEDEA ion contained in the glass fiber separator was intercalated into the electrode B. The electricity conduction was continued, and as a result, the composition (molar ratio) of the non-aqueous electrolyte changed to Li.FAP/MOEDEA.FAP=1/20.

Thereafter, the electrode B was taken out from the cell, and a 100-μm-thick copper foil (available from The Nilaco Corporation) was laminated in place of the electrode B. The resultant product was a cell including a lithium foil, a non-aqueous electrolyte containing Li.FAP, and a copper foil. The cell was used to perform charge and discharge at a constant current of 10 μA/cm² within the range of 2.6 to 4.2 V.

Figure 11:
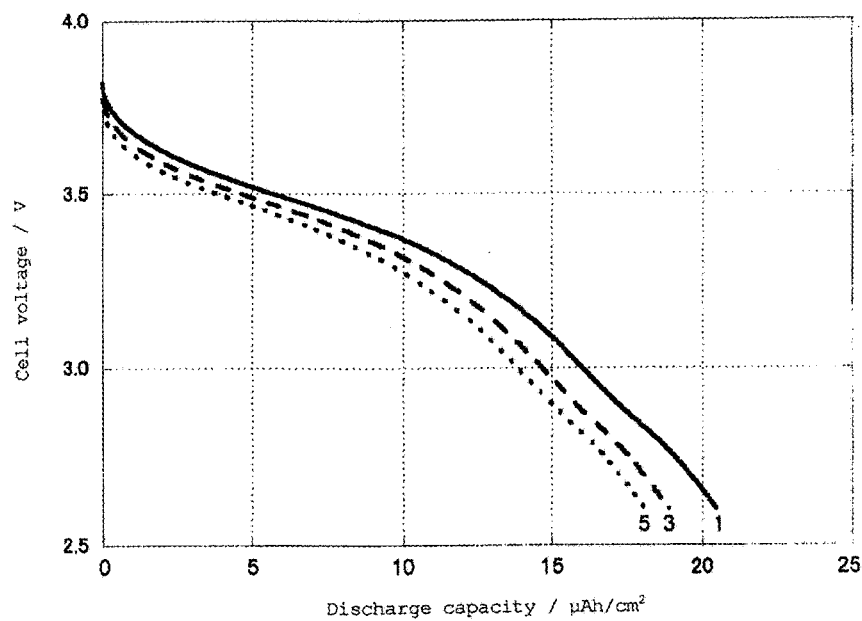

FIG. 11 shows discharge curves at the 1$^{st}$, 3$^{rd}$ and 5$^{th}$ cycles. FIG. 11 shows that, like in the case of $Cu(BF_4)_2$, discharge occurred at an average potential of approximately 3.4 V. Moreover, the cycle characteristics were improved when using FAP as the polyatomic ion, as compared to when using $BF_4^-$. Furthermore, the voltage behavior similar to that of $Cu(BF_4)_2$ was observed, suggesting that the reaction represented by the formula (H) proceeded:

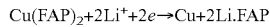

$$Cu(FAP)_2 + 2Li^+ + 2e \rightarrow Cu + 2Li.FAP \quad (H)$$

Example 13

Bismuth ion (Bi³⁺) was used as the metal ion, and an experiment similar to in Example 10 was performed. As for the non-aqueous electrolyte, reference electrode, and counter electrode, the same ones as used in Example 10 were used. As for the working electrode, a bismuth wire (available from Alfa Aesar) of approximately 1.5 mm in diameter was used.

Figure 12:
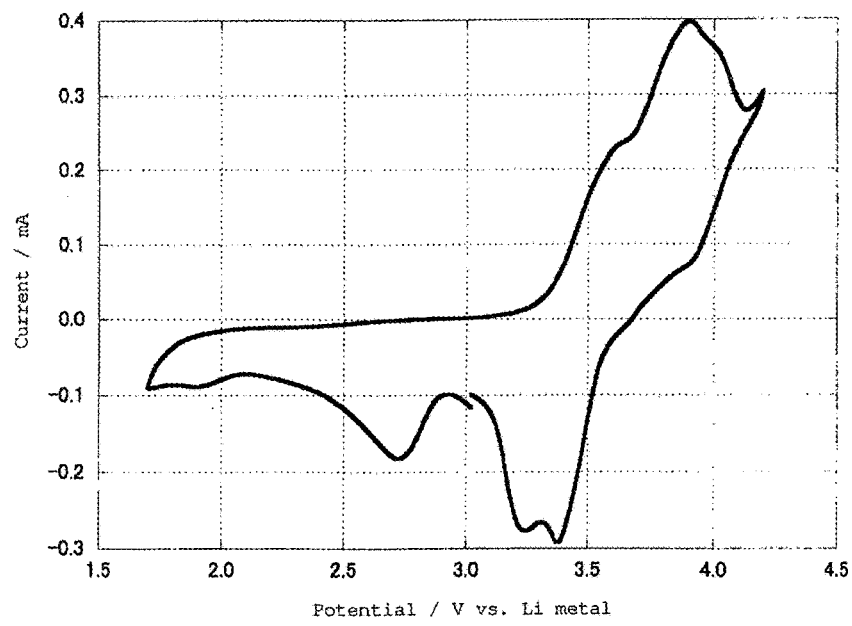

The working electrode, reference electrode, and counter electrode were soaked in the non-aqueous electrolyte, and cyclic voltammetry was performed at a sweep rate of 1 mV/sec within the range of 1.7 to 4.2 V. FIG. 12 shows a waveform at the 3$^{rd}$ cycle.

On FIG. 12, three reduction peaks appear within the voltage range of 1.7 to 3.7 V. Bismuth can have valences of +1 and +3. Therefore, the above indicates that $Bi(BF_4)_3$ produced by sweeping up to 4.2 V underwent reactions represented by the formulas (I), (J), and (K), and was reduced to Bi. The electric capacity when $Bi(BF_4)_3$ is reduced to Bi is 171 mA/g.

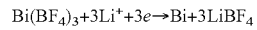

$$Bi(BF_4)_3 + 3Li^+ + 3e \rightarrow Bi + 3LiBF_4 \quad (I)$$

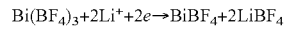

$$Bi(BF_4)_3 + 2Li^+ + 2e \rightarrow BiBF_4 + 2LiBF_4 \quad (J)$$

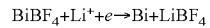

$$BiBF_4 + Li^+ + e \rightarrow Bi + LiBF_4 \quad (K)$$

Thereafter, bismuth powder (available from Alfa Aesar), acetylene black (AB) serving as a conductive agent, and polytetrafluoroethylene powder (PTFE) serving as a binder were kneaded in a mass ratio of Bi/AB/PTFE=70/20/10, and pressed between a pair of rollers, into a sheet. A 3-mm disc was punched out from the sheet, and press-fitted to a 100-mesh platinum net, to give a test electrode. The test electrode corresponds to a positive electrode for a battery or a hybrid capacitor.

Figure 13:
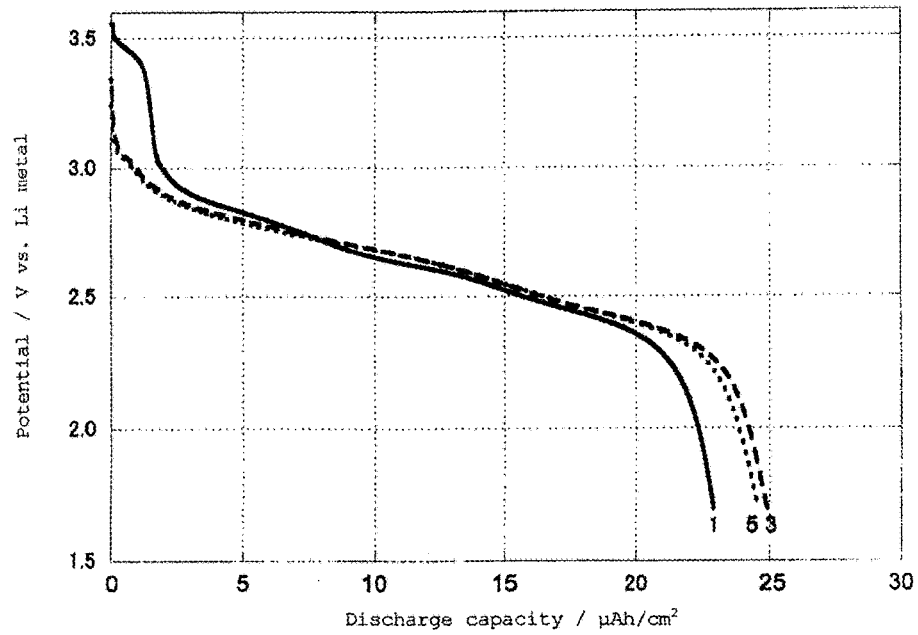

The obtained test electrode was used to perform charge and discharge at a constant current of 10 μA/cm² within the range of 1.7 to 3.6 V. FIG. 13 shows discharge curves at the 1$^{st}$, 3$^{rd}$ and 5$^{th}$ cycles. FIG. 13 shows that discharge curves corresponding to the reduction current on the low-potential side on FIG. 12 can be obtained.

Example 14

Examination was made to confirm that, when the active material and the non-aqueous electrolyte contain different polyatomic anions, the oxidation-reduction reactions of the metal ion contained in the active material proceed stably.

Here, a non-aqueous electrolyte in which the molar ratio of $LiCF_3SO_3/DEME.BF_4=1/10$ was used. As for the reference electrode and counter electrode, the same ones as used in Example 10 were used. As for the counter electrode, a copper wire of 1 mm in diameter was used.

The potential of the working electrode was held at 4.5 V, which produced more $Cu(CF_3SO_3)_2$ than $Cu(BF_4)_2$. This was because during charge, copper ion reacts more preferentially with $CF_3SO_3^-$ than with $BF_4^-$.

Thereafter, $Cu(CF_3SO_3)_2$ (triflate), acetylene black (AB) serving as a conductive agent, and polytetrafluoroethylene powder (PTFE) serving as a binder were kneaded in a mass ratio of triflate/AB/PTFE=70/20/10, and pressed between a pair of rollers, into a sheet. A 3-mm disc was punched out from the sheet, and press-fitted to a 100-mesh platinum net, to give a test electrode. The test electrode corresponds to a positive electrode for a battery or a hybrid capacitor.

Figure 14:
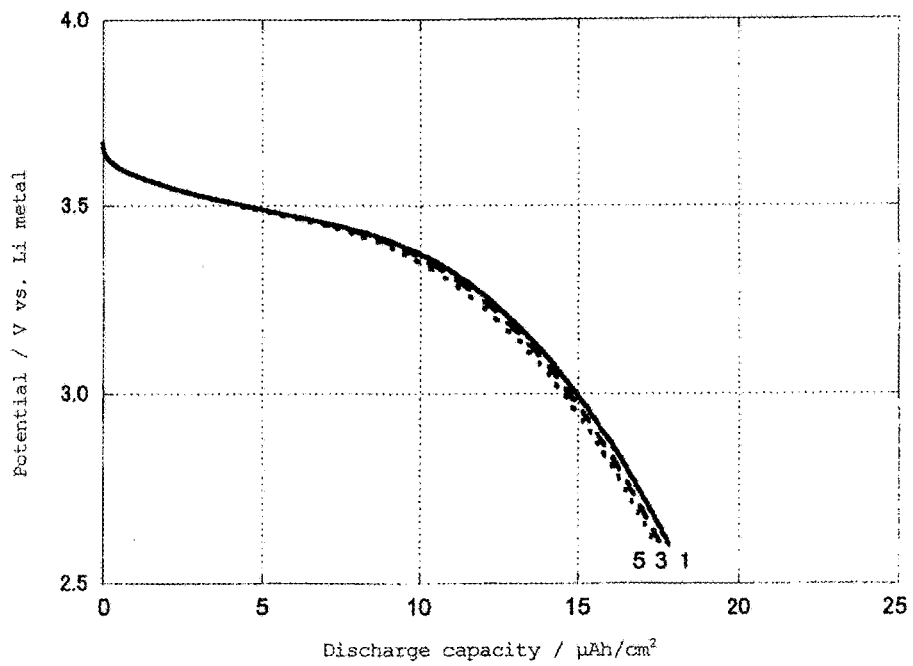

Subsequently, the test electrode and a non-aqueous electrolyte in which the molar ratio of $LiBF_4/DEME.BF_4=1/10$ were used to perform charge and discharge at a constant current of 10 μA/cm² within the range of 2.6 to 4.2 V. FIG. 14 shows discharge curves at the 1$^{st}$, 3$^{rd}$ and 5$^{th}$ cycles.

FIG. 14 shows that discharge proceeded at an average potential of approximately 3.3 V. At this potential, the reaction represented by the formula (L) occurs. As compared with FIG. 10 of Example 11, the potential was about 0.1V lower than that of $Cu(BF_4)_2$, but the cycle characteristics were significantly improved.

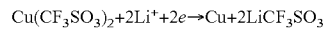

$$Cu(CF_3SO_3)_2 + 2Li^+ + 2e \rightarrow Cu + 2LiCF_3SO_3 \quad (L)$$

Example 15

Similarly to in Example 14, examination was made to confirm that, when the polyatomic anion contained in the active material is different from that in the non-aqueous electrolyte, the oxidation-reduction reactions of the metal ion contained in the active material proceed stably.

Here, a non-aqueous electrolyte in which the molar ratio of $LiClO_4/TMPA.TFSI=1/10$ was used. TMPA is trimethylpropyl ammonium ion, and TFSI is $(CF_3SO_3)_2N^-$. As for the reference electrode and counter electrode, the same ones as used in Example 10 were used. As for the counter electrode, a copper wire of 1 mm in diameter was used.

Figure 15:
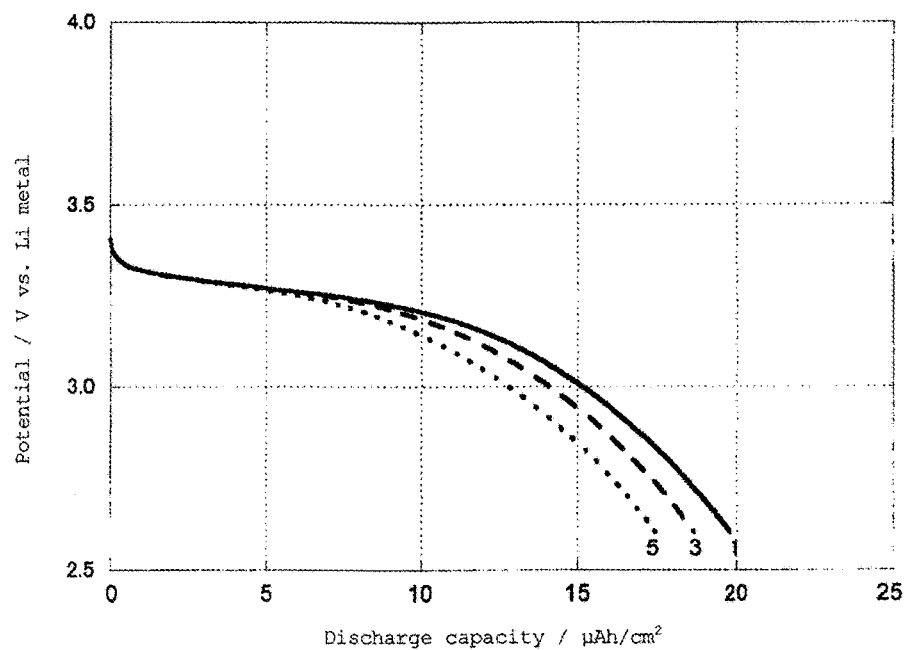

First, the potential of the working electrode was held at 4.5 V, to prepare $Cu(ClO_4)_2$. Next, $Cu(ClO_4)_2$, acetylene black (AB) serving as a conductive agent and polytetrafluoroethylene powder (PTFE) serving as a binder were kneaded in a mass ratio of $Cu(ClO_4)_2$/AB/PTFE=70/20/10, and pressed between a pair of rollers, into a sheet. A 3-mm disc was punched out from the sheet, and press-fitted to a 100-mesh platinum net, to give a test electrode. Subsequently, the test electrode was used to perform charge and discharge in a non-aqueous electrolyte having the same composition at a constant current of 10 $\mu A/cm^2$ within the range of 2.6 to 4.2 V. FIG. 15 shows discharge curves at the $1^{st}$, $3^{rd}$ and $5^{th}$ cycles.

FIG. 15 shows that discharge proceeded at an average potential of approximately 3.2 V. At this potential, the reaction represented by the formula (M) occurs. As compared with FIG. 10 of Example 11, the potential was about 0.2 V lower than that of $Cu(BF_4)_2$, but the cycle characteristics were improved.

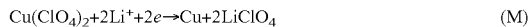

$$Cu(ClO_4)_2 + 2Li^+ + 2e \rightarrow Cu + 2LiClO_4 \quad (M)$$

As shown above, a metal salt having a metal ion and a polyatomic anion can be easily prepared electrochemically. By using such a metal salt, oxidation and reduction reactions in which the hysteresis is small proceed. This improves the charge efficiency and suppresses the voltage drop during discharge. Moreover, by reducing the formula weight of the polyatomic anion, an electrochemical energy storage device having a high energy density can be provided.

Furthermore, when the metal ion is magnesium ion, even when the concentration of magnesium ion in the non-aqueous electrolyte is low, magnesium metal can be produced at the negative electrode. Therefore, magnesium metal can be used as the negative electrode for an electrochemical energy storage device. Magnesium, because of its low redox potential and high capacity, is ideal for an electrochemical energy storage device having a high energy density.

Figure 16:
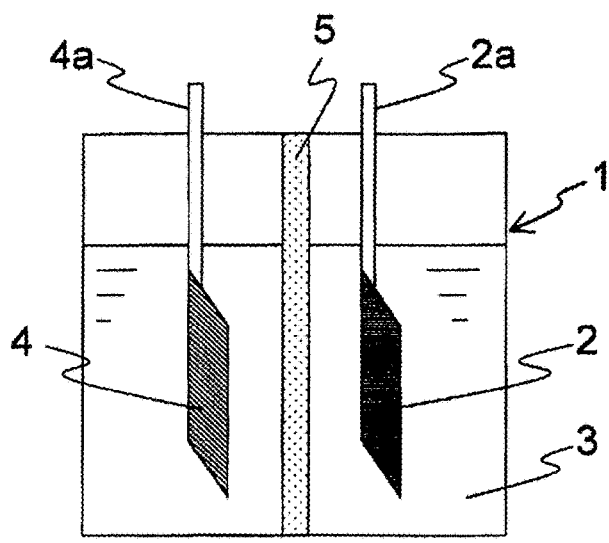

FIG. 16 illustrates an exemplary configuration of an electrochemical energy storage device 10. The electrochemical energy storage device 10 includes: a non-aqueous electrolyte 3 contained in a case 1; and a positive electrode 2 and a negative electrode 4 soaked in the non-aqueous electrolyte 3. The positive electrode 2 and the negative electrode 4 are preferably disposed face to face with a porous film (separator) 5 interposed therebetween. One end of a positive electrode lead 2a made of metal is connected to the positive electrode 2, and the other end thereof is extended outside from the case 1, which forms a positive electrode outer terminal. On the other hand, one end of a negative electrode lead 4a made of metal is connected to the negative electrode 4, and the other end thereof is extended outside from the case 1, which forms a negative electrode outer terminal. Note that the above configuration is merely one exemplary configuration of the electrochemical energy storage device 10, and the configuration of an electrochemical energy storage device is not limited thereto.

INDUSTRIAL APPLICABILITY

The present invention is applicable to electrochemical energy storage devices such as non-aqueous electrolyte batteries and hybrid capacitors, and is useful as a power source of various devices such as cellular phones, personal digital assistants, personal computers, camcorders, portable game players. It can be also utilized as a driving power source or auxiliary power source of an electric motor for hybrid electric vehicles, plug-in hybrid electric vehicles, fuel cell-powered vehicles, and the like, and a driving power source for electrically-powered tools, vacuum cleaners, robots, and the like.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. An electrochemical energy storage device comprising:
a first electrode including a first active material;
a second electrode including a second active material different in composition from the first active material; and
a non-aqueous electrolyte interposed between the first electrode and the second electrode, wherein:
the first active material includes a first metal salt having a first polyatomic anion and a first metal ion, the first metal salt exhibiting oxidation-reduction reaction involving reversible release and acceptance of the first polyatomic anion,
the non-aqueous electrolyte has electrical conductivity via the first polyatomic anion acting as a carrier,
the first polyatomic anion includes fluorocomplex ions having boron as nucleus, and
the first metal ion includes at least one selected from the group consisting of cations of Fe, Cu and Bi.

2. The electrochemical energy storage device in accordance with claim 1, wherein:
the non-aqueous electrolyte includes an organic solvent and a solute dissolved in the organic solvent,
the solute includes a third polyatomic anion and a third metal ion,
the third metal ion is at least one selected from the group consisting of cations of alkali metals and alkaline earth metals, and
a molar ratio of the third metal ion to the organic solvent in the non-aqueous electrolyte satisfies: the third metal ion/the organic solvent=1/2 to 1/6.

3. The electrochemical energy storage device in accordance with claim 2, wherein the organic solvent is at least one selected from the group consisting of cyclic carbonates, cyclic esters, linear carbonates, cyclic ethers, linear ethers, nitriles, and heterocyclic compounds.

4. The electrochemical energy storage device in accordance with claim 3, wherein the organic solvent is at least one selected from the group consisting of propylene carbonate, dimethyl carbonate, tetrahydrofuran, and dimethoxyethane.

5. The electrochemical energy storage device in accordance with claim 2, wherein the first metal salt and the organic solvent form an adduct.

6. The electrochemical energy storage device in accordance with claim 5, wherein the organic solvent comprises tetrahydrofuran.

7. The electrochemical energy storage device in accordance with claim 1, wherein the non-aqueous electrolyte comprises an ionic liquid.

* * * * *